US009896601B2

(12) United States Patent
Setzke

(10) Patent No.: US 9,896,601 B2
(45) Date of Patent: Feb. 20, 2018

(54) DIRT PICK-UP RESISTANT SILICONE COMPOSITIONS

(71) Applicant: Gaco Western, LLC, Waukesha, WI (US)

(72) Inventor: David Edward Setzke, Waukesha, WI (US)

(73) Assignee: Gaco Western, LLC, Waukesha, WI (US)

( * ) Notice: Subject to any disclaimer, the term of this patent is extended or adjusted under 35 U.S.C. 154(b) by 0 days.

(21) Appl. No.: 15/167,175

(22) Filed: May 27, 2016

(65) Prior Publication Data

US 2016/0347956 A1 Dec. 1, 2016

Related U.S. Application Data

(60) Provisional application No. 62/166,888, filed on May 27, 2015.

(51) Int. Cl.
| | |
|---|---|
| *C08K 5/00* | (2006.01) |
| *C09D 183/04* | (2006.01) |
| *C09D 5/33* | (2006.01) |
| *C09D 7/12* | (2006.01) |
| *C08K 3/22* | (2006.01) |
| *C08K 3/36* | (2006.01) |
| *C08K 5/5465* | (2006.01) |
| *C08K 5/3475* | (2006.01) |

(52) U.S. Cl.
CPC ........... *C09D 183/04* (2013.01); *C09D 5/004* (2013.01); *C09D 7/1233* (2013.01); *C08K 3/36* (2013.01); *C08K 5/0041* (2013.01); *C08K 5/3475* (2013.01); *C08K 5/5465* (2013.01); *C08K 2003/2241* (2013.01)

(58) Field of Classification Search
CPC .. C09D 5/1675; C09D 5/1687; C09D 183/04; C08K 2003/2241
USPC ........................................................ 524/91
See application file for complete search history.

(56) References Cited

U.S. PATENT DOCUMENTS

| | | | |
|---|---|---|---|
| 3,607,972 A | 9/1971 | Kiles et al. | |
| 4,293,597 A | 10/1981 | Bessmer et al. | |
| 5,324,542 A | 6/1994 | Modic | |
| 5,494,756 A | 2/1996 | Siegel | |
| 6,303,188 B1 | 10/2001 | Bors et al. | |
| 6,824,832 B2 | 11/2004 | Hansen | |
| 6,833,407 B1 | 12/2004 | Ahmed et al. | |
| 7,803,867 B2 | 9/2010 | Hanrahan et al. | |
| 7,807,744 B2 | 10/2010 | Barnes et al. | |
| 2003/0054714 A1* | 3/2003 | Peng ..................... | B32B 17/067 442/71 |
| 2006/0194067 A1 | 8/2006 | Beger et al. | |
| 2006/0217453 A1 | 9/2006 | Lauer et al. | |
| 2006/0264563 A1 | 11/2006 | Hanrahan et al. | |
| 2007/0203262 A1 | 8/2007 | Crossley | |
| 2007/0238827 A1 | 10/2007 | Brady et al. | |
| 2008/0044577 A1* | 2/2008 | Batdorf ................ | C09D 5/1668 427/384 |
| 2008/0045631 A1 | 2/2008 | Henn | |
| 2008/0166493 A1 | 7/2008 | Xiao et al. | |
| 2008/0293872 A1 | 11/2008 | Loth et al. | |
| 2010/0130666 A1 | 5/2010 | Hart et al. | |
| 2010/0288963 A1 | 11/2010 | Mitina et al. | |
| 2011/0039077 A1* | 2/2011 | Klemann ............. | B41M 7/0027 428/195.1 |
| 2011/0040006 A1 | 2/2011 | Peter et al. | |
| 2011/0151244 A1 | 6/2011 | Wu et al. | |
| 2011/0159300 A1 | 6/2011 | Rokowski et al. | |
| 2013/0197149 A1 | 8/2013 | Burghart | |
| 2014/0072817 A1 | 3/2014 | Simal et al. | |
| 2014/0235780 A1 | 8/2014 | Rokowski et al. | |
| 2014/0275315 A1 | 9/2014 | Hibben et al. | |
| 2014/0275388 A1 | 9/2014 | Rokowski et al. | |

FOREIGN PATENT DOCUMENTS

| | | | |
|---|---|---|---|
| CN | 101775217 | * | 7/2010 |
| CN | 102352214 | * | 2/2012 |
| WO | 2008149134 | | 12/2008 |

OTHER PUBLICATIONS

Translation of CN101775217, Li et al., Jul. 14, 2010.*
Translation of CN102352214, Zeng, Feb. 15, 2012.*
Hawkins et al. "The protein resistance of silicones prepared with a PEO-silane amphiphile", J. Mater. Chem., 2012, 22, 19540-19546.
Hawkins et al. "Bacteria and diatom resistance of silicones modified with PEO-silane amphiphiles", Biofouling, 2014, 30(2), 247-58.
Hawkins et al., "Direct observation of the nanocomplex surface reorganization of antifouling silicones containing a highly mobile PEO-silane amphiphile", J. Mater. Chem. B, 2014, 2, 5689-5697.
Rufin et al., "Enhancing the protein resistance of silicone via surface-restructuring PEO-silane amphiphiles with variable PEO length", J. Mater. Chem. B Mater Biol Med., 2015, 3(14), 2816-2825.

* cited by examiner

*Primary Examiner* — Hui Chin
(74) *Attorney, Agent, or Firm* — Michael Best & Friedrich LLP

(57) ABSTRACT

Silicone compositions and methods of using the compositions are provided. The silicone coatings can exhibit improved dirt pick-up resistance and cleanability. The silicone compositions include a polysiloxane, an ultraviolet absorber, and optionally one or more of a pigment, a filler, a crosslinker, an adhesion promoter, a catalyst, additives or solvents.

20 Claims, 11 Drawing Sheets

DIRT PICK-UP RESISTANT SILICONE COMPOSITIONS

CROSS-REFERENCE TO RELATED APPLICATION(S)

This application claims priority to U.S. Provisional Patent Application No. 62/166,888, filed on May 27, 2015, which is incorporated herein by reference in its entirety.

TECHNICAL FIELD

The present disclosure relates generally to silicone compositions and methods of using the compositions. More specifically, the present disclosure relates to silicone coatings resistant to dirt pick-up or coatings that are cleanable.

BACKGROUND

Roof coatings based on silicone polymers exhibit a tendency to accumulate dirt (often called dirt pick-up). Dirt pick-up lead can lead to an undesired dingy appearance, and can compromise the solar reflectivity of the coating. The dirt and grime that does collect over several weeks of outside exposure along the surface of the coating tends to be difficult to remove using standard cleaning methods. The loss of the aesthetic or functional qualities of the roof coating due to this soiling can result in premature or frequent maintenance or replacement. Accordingly, there exists a need for coatings that either accumulate less dirt or are more easily cleaned.

DETAILED DESCRIPTION

Figure 1:
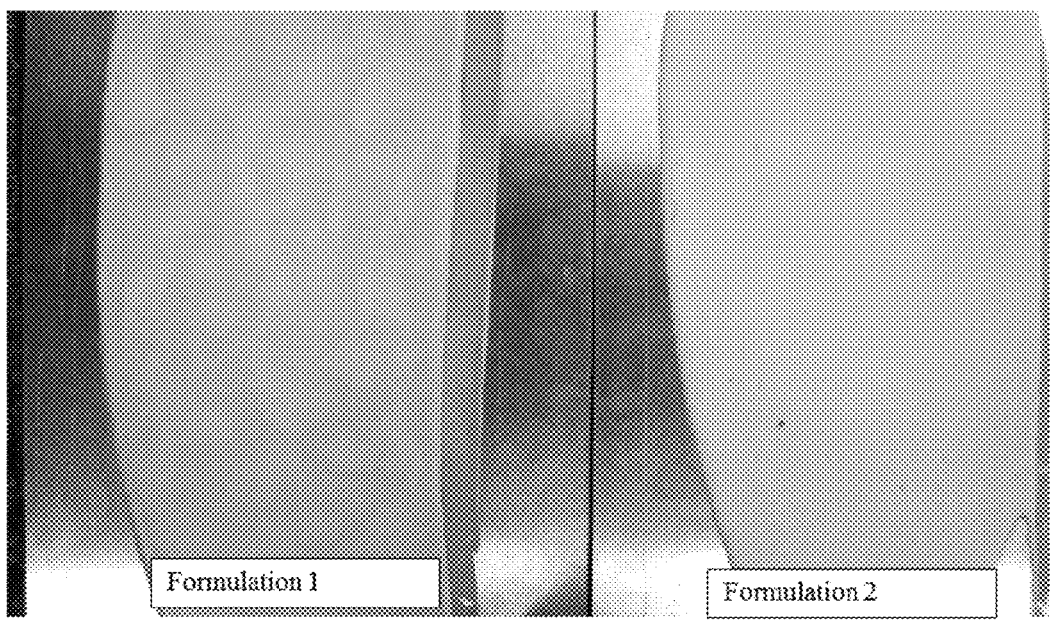
FIG. 1 depicts films of control (Formulation 1) and exemplary (Formulation 2) formulations on aluminum after ten months of exterior exposure.

Disclosed herein are silicone compositions useful as protective exterior coatings. It has been unexpectedly found that the disclosed compositions exhibit improved dirt pick-up resistance or cleanability relative to conventional silicone formulations. Consequently, use of the disclosed compositions as exterior protective coatings can result in lower maintenance or replacement costs over the coatings' lifetime. In addition, the compositions can sustain a high level of solar reflectivity relative to conventional coatings, thereby providing further savings via reduced energy consumption.

Without wishing to be bound by theory, it is believed the disclosed compositions exhibit the improved dirt pick-up resistance or cleanability through one or more mechanisms of action selected from an improved sheeting effect that prevents dirt spotting; an improved hardening at the coating surface that attracts and retains less dirt; reduced chemical adherence to the coating surface through action of one or more composition components (e.g., the UV-absorber); and reduced charge build-up at the coating surface; or any combination thereof.

1. DEFINITION OF TERMS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

As used herein, the term "suitable substituent" is intended to mean a chemically acceptable functional group (i.e., a moiety that does not negate the activity of the disclosed compositions). Illustrative examples of suitable substituents include, but are not limited to, halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl group, heteroaryl groups, aryloxy groups, heteroaryloxy groups, aralkyl groups, heteroaralkyl groups, HO—(C=O)— groups, heterocylic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups and the like. Those skilled in the art will appreciate that many substituents can be substituted by additional substituents.

As used herein, the term "alkenyl" refers a straight or branched hydrocarbon chain containing from 2 to 10 carbons and containing at least one carbon-carbon double bond formed by the removal of two hydrogens. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, and 3-decenyl. Alkenyl groups may be unsubstituted or substituted by one or more suitable substituents, preferably 1 to 3 suitable substituents, as defined above.

As used herein, the term "alkoxy" refers to an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

As used herein, the term "alkyl" refers to a linear or branched hydrocarbon radical, preferably containing 1 to 10 carbon atoms. The term "$C_1$-$C_6$-alkyl" is defined to include alkyl groups having 1, 2, 3, 4, 5, or 6 carbons in a linear or branched arrangement. For example, "$C_1$-$C_6$-alkyl" specifically includes methyl, ethyl, n-propyl, i-propyl, n-butyl, t-butyl, i-butyl, pentyl, and hexyl. Alkyl groups may be unsubstituted or substituted by one or more suitable substituents, preferably 1 to 3 suitable substituents, as defined above.

As used herein, the term "alkynyl" refers to a straight or branched hydrocarbon radical having 2, 3, 4, 5, 6, 7, 8, 9 or 10 carbons, and having one or more carbon-carbon triple bonds. Alkynyl groups include, but are not limited to, ethynyl, propynyl, and butynyl. Alkynyl groups may be unsubstituted or substituted by one or more suitable substituents, preferably 1 to 3 suitable substituents, as defined above.

As used herein, the term "amino" refers to an —$NH_2$ group.

As used herein, the term "aminoalkyl" refers to at least one amino group, as defined herein, appended to the parent molecular moiety through an alkyl group, as defined herein. Representative examples of aminoalkyl include, but are not limited to, aminomethyl, 2-aminoethyl, and 2-aminopropyl.

As used herein, the term "aryl" means monocyclic, bicyclic, or tricyclic aromatic radicals. Representative examples of the aryl groups include, but are not limited to, phenyl, dihydroindenyl, indenyl, naphthyl, dihydronaphthalenyl, and tetrahydronaphthalenyl. Aryl groups may be optionally substituted by one or more suitable substituents, preferably 1 to 5 suitable substituents, as defined above.

As used herein, the term "carbonyl" or "(C=O)" (as used in phrases such as alkylcarbonyl, alkyl —(C=O)— or alkoxycarbonyl) refers to the joinder of the >C=O moiety to a second moiety such as an alkyl or amino group (i.e. an amido group). Alkoxycarbonylamino (i.e. alkoxy(C=O)—NH—) refers to an alkyl carbamate group. The carbonyl group is also equivalently defined herein as (C=O). Alkylcarbonylamino refers to groups such as acetamide.

As used herein, the term "cycloalkyl" refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1]heptanyl, bicyclo[3.2.1]octanyl and bicyclo[5.2.0]nonanyl, etc.); optionally containing 1 or 2 double bonds. Cycloalkyl groups may be unsubstituted or substituted by one or more suitable substituents, preferably 1 to 5 suitable substituents, as defined above.

As used herein, the term "halogen" or "halo" refers to a fluoro, chloro, bromo or iodo radical.

As used herein, the term "haloalkyl" refers to an alkyl group, as defined herein, substituted by one, two, three, or four halogen atoms. Representative examples of haloalkyl include, but are not limited to, chloromethyl, 2-fluoroethyl, trifluoromethyl, pentafluoroethyl, 2-chloro-3-fluoropentyl, and 4,4,4-trifluorobutyl.

As used herein, the term "heteroaryl" refers to a monocyclic heteroaryl or a bicyclic heteroaryl. The monocyclic heteroaryl is a five- or six-membered ring. The five-membered ring contains two double bonds. The five-membered ring may contain one heteroatom selected from O or S; or one, two, three, or four nitrogen atoms and optionally one oxygen or sulfur atom. The six-membered ring contains three double bonds and one, two, three or four nitrogen atoms. Representative examples of monocyclic heteroaryl include, but are not limited to, furanyl, imidazolyl, isoxazolyl, isothiazolyl, oxadiazolyl, 1,3-oxazolyl, pyridinyl, pyridazinyl, pyrimidinyl, pyrazinyl, pyrazolyl, pyrrolyl, tetrazolyl, thiadiazolyl, 1,3-thiazolyl, thienyl, triazolyl, and triazinyl. The bicyclic heteroaryl includes a monocyclic heteroaryl fused to a phenyl, or a monocyclic heteroaryl fused to a monocyclic cycloalkyl, or a monocyclic heteroaryl fused to a monocyclic cycloalkenyl, or a monocyclic heteroaryl fused to a monocyclic heteroaryl, or a monocyclic heteroaryl fused to a monocyclic heterocycle. Representative examples of bicyclic heteroaryl groups include, but are not limited to, benzofuranyl, benzothienyl, benzoxazolyl, benzimidazolyl, benzoxadiazolyl, 6,7-dihydro-1,3-benzothiazolyl, imidazo[1,2-a]pyridinyl, indazolyl, indolyl, isoindolyl, isoquinolinyl, naphthyridinyl, pyridoimidazolyl, quinazolinyl, quinolinyl, thiazolo[5,4-b]pyridin-2-yl, thiazolo[5,4-d]pyrimidin-2-yl, and 5,6,7,8-tetrahydroquinolin-5-yl. Heteroaryl groups may be unsubstituted or substituted by one or more suitable substituents, preferably 1 to 5 suitable substituents, as defined above.

As used herein, the term "heterocycle" or "heterocyclyl" refers to a monocyclic heterocycle, a bicyclic heterocycle, or a tricyclic heterocycle. The monocyclic heterocycle is a three-, four-, five-, six-, seven-, or eight-membered ring containing at least one heteroatom independently selected from the group consisting of oxygen, nitrogen, phosphorus and sulfur. The three- or four-membered ring contains zero or one double bond, and one heteroatom selected from the group consisting of oxygen, nitrogen, phosphorus and sulfur. The five-membered ring contains zero or one double bond and one, two or three heteroatoms selected from the group consisting of oxygen, nitrogen, phosphorus and sulfur. The six-membered ring contains zero, one or two double bonds and one, two, or three heteroatoms selected from the group consisting of oxygen, nitrogen, phosphorus and sulfur. The seven- and eight-membered rings contains zero, one, two, or three double bonds and one, two, or three heteroatoms selected from the group consisting of oxygen, nitrogen, phosphorus and sulfur. Representative examples of monocyclic heterocycles include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, phosphinane, piperazinyl, piperidinyl, pyranyl, pyrazolinyl, pyrazolidinyl, pyrrolinyl, pyrrolidinyl, tetrahydrofuranyl, tetrahydropyranyl, tetrahydropyridinyl, tetrahydropyrimidinyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to a phenyl group, or a monocyclic heterocycle fused to a monocyclic cycloalkyl, or a monocyclic heterocycle fused to a monocyclic cycloalkenyl, or a monocyclic heterocycle fused to a monocyclic heterocycle, or a bridged monocyclic heterocycle ring system in which two non-adjacent atoms of the ring are linked by an alkylene bridge of 1, 2, 3, or 4 carbon atoms, or an alkenylene bridge of two, three, or four carbon atoms. Representative examples of bicyclic heterocycles include, but are not limited to, benzopyranyl, benzothiopyranyl, chromanyl, 2,3-dihydrobenzofuranyl, 2,3-dihydrobenzothienyl, azabicyclo[2.2.1]heptyl (including 2-azabicyclo[2.2.1]hept-2-yl), 2,3-dihydro-1H-indolyl, isoindolinyl, octahydrocyclopenta[c]pyrrolyl, octahydropyrrolopyridinyl, 9-phosphabicyclo[3.3.1]nonane, 8-phosphabicyclo[3.2.1]octane, and tetrahydroisoquinolinyl. Tricyclic heterocycles are exemplified by a bicyclic heterocycle fused to a phenyl group, or a bicyclic heterocycle fused to a monocyclic cycloalkyl, or a bicyclic heterocycle fused to a monocyclic cycloalkenyl, or a bicyclic heterocycle fused to a monocyclic heterocycle, or a bicyclic heterocycle in which two non-adjacent atoms of the bicyclic ring are linked by an alkylene bridge of 1, 2, 3, or 4 carbon atoms, or an alkenylene bridge of two, three, or four carbon atoms. Examples of tricyclic heterocycles include, but are not limited to, octahydro-2,5-epoxypentalene, hexahydro-2H-2,5-methanocyclopenta[b]furan, hexahydro-1H-1,4-methanocyclopenta[c]furan, aza-admantane (1-azatricyclo[3.3.1.1$^{3,7}$]decane), oxa-adamantane (2-oxatricyclo[3.3.1.1$^{3,7}$]decane), and 2,4,6-trioxa-8-phosphatricyclo[3.3.1.1$^{3,7}$]decane. Heterocyclic groups may be unsubstituted or substituted by one or more suitable substituents, preferably 1 to 3 suitable substituents, as defined above.

As used herein, the term "hydroxy" refers to an —OH group.

As used herein, the term "hydroxyalkyl" refers to an alkyl group, as defined herein, substituted by at least one hydroxy group. Representative examples of hydroxyalkyl include, but are not limited to, hydroxymethyl, 2-hydroxyethyl, 3-hydroxypropyl, 2,3-dihydroxypropyl, 2,3-dihydroxypentyl, 4-hydroxybutyl, 2-ethyl-4-hydroxyheptyl, 3,4-dihydroxybutyl, and 5-hydroxypentyl.

A prefix attached to a multi-component substituent only applies to the first component it precedes. To illustrate, the term "alkylcycloalkyl" contains two components: alkyl and cycloalkyl. Thus, the $C_1$-$C_6$-prefix on $C_1$-$C_6$-alkylcycloalkyl means that the alkyl component of the alkylcycloalkyl contains from 1 to 6 carbon atoms; the $C_1$-$C_6$-prefix does not describe the cycloalkyl component. To illustrate further, the prefix "halo" on haloalkoxyalkyl indicates that only the alkoxy component of the alkoxyalkyl substituent is substituted with one or more halogen radicals. If the halogen substitution may only occur on the alkyl component, the substituent would instead be described as "alkoxyhaloalkyl."

A substituent is "substitutable" if it comprises at least one carbon or nitrogen atom that is bonded to one or more hydrogen atoms. Thus, for example, hydrogen, halogen, and cyano do not fall within this definition. In addition, a sulfur atom in a heterocyclyl containing such atom is substitutable with one or two oxo substituents.

If a substituent is described as being "substituted", a non-hydrogen radical is in the place of hydrogen radical on a carbon or nitrogen of the substituent. Thus, for example, a substituted alkyl substituent is an alkyl substituent in which at least one non-hydrogen radical is in the place of a hydrogen radical on the alkyl substituent. To illustrate, monofluoroalkyl is alkyl substituted with a fluoro radical, and difluoroalkyl is alkyl substituted with two fluoro radicals. It should be recognized that if there is more than one substitution on a substituent, each non-hydrogen radical may be identical or different (unless otherwise stated).

When a substituent is referred to as "unsubstituted" or not referred to as "substituted" or "optionally substituted", it means that the substituent does not have any substituents. If a substituent is described as being "optionally substituted", the substituent may be either (1) not substituted or (2) substituted. If a substituent is described as being optionally substituted with up to a particular number of non-hydrogen radicals, that substituent may be either (1) not substituted; or (2) substituted by up to that particular number of non-hydrogen radicals or by up to the maximum number of substitutable positions on the substituent, whichever is less. Thus, for example, if a substituent is described as a heteroaryl optionally substituted with up to 3 non-hydrogen radicals, then any heteroaryl with less than 3 substitutable positions would be optionally substituted by up to only as many non-hydrogen radicals as the heteroaryl has substitutable positions. To illustrate, tetrazolyl (which has only one substitutable position) would be optionally substituted with up to one non-hydrogen radical. To illustrate further, if an amino nitrogen is described as being optionally substituted with up to 2 non-hydrogen radicals, then a primary amino nitrogen will be optionally substituted with up to 2 non-hydrogen radicals, whereas a secondary amino nitrogen will be optionally substituted with up to only 1 non-hydrogen radical.

If substituents are described as being "independently selected" from a group, each substituent is selected independent of the other. Each substituent, therefore, may be identical to or different from the other substituent(s).

A coating discolors when it picks up dirt. Delta E is measured by a spectrophotometer by comparing the coating that is exposed to dirt and the coating that is "clean" of dirt. The difference is expressed as delta E. The difference in delta E's from a "control" coating and an "experimental" coating can then be calculated. The improvement in dirt pick-up resistance can be expressed as a percentage by taking the difference in delta E divided by the delta E of the "control" coating. Delta E can be calculated according to equation (1), $$\Delta E = [(\Delta a)^2 + (\Delta b)^2 + (\Delta L)^2]^{1/2} \qquad (1)$$

wherein Delta L refers to the lightness/darkness difference; Delta a refers to the red/green difference; Delta b refers to the yellow/blue difference; and Delta E refers to the total color difference that integrates the differences between the L, a, and b values of the initial and developed color.

As used herein, the term "wt % based on binder solids" or "wt % based on resin solids" refers to weight of the material per weight of solid material in the formulation minus fillers, pigments and non-film formers. Pigments are typically solids materials that add color and cannot be dissolved in standard solvents. Examples of pigments are titanium dioxide, red iron oxide, phthalocyanine blue. Fillers typically impart little or no color to a film and generally function as solids to impart economics, chemical resistance, corrosion resistance, and rheology. Examples of fillers are talc, clay, silica, and calcium carbonate. Binder solids may refer to resin solids. In certain embodiments, "wt % based on binder solids" may refer to wt % based on polysiloxane resin content. In certain embodiments, "wt % based on binder solids" may refer to wt % based on polydimethylsiloxane resin content.

As used herein, the term "exterior environment" may refer to an environment characterized by a tropical/megathermal climate, a dry (arid and semiarid) climate, a temperate/mesothermal climate, a continental/microthermal climate, or a polar or alpine climate. Such climates are delineated in the Köppen climate classification system.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. SILICONE COMPOSITIONS

Disclosed are silicone-based compositions. The compositions include at least one polysiloxane, at least one ultraviolet absorber, and optionally one or more pigments, fillers, crosslinkers, adhesion promoters, catalysts, solvents, or additives.

a. Polysiloxanes

The disclosed compositions include at least one polysiloxane component. The polysiloxane may be a hydroxy-terminated polysiloxane or a non-hydroxy-terminated polysiloxane. The compositions can include a combination of polysiloxanes.

In certain embodiments, the polysiloxane component has formula:

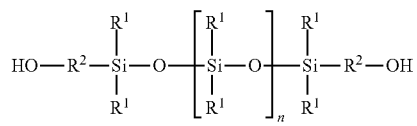

wherein $R^1$ at each occurrence is independently selected from alkyl, alkenyl, alkynyl, aryl, arylalkyl, heteroaryl, heteroarylalkyl, cycloalkyl, cycloalkylalkyl, heterocyclyl, and heterocyclylalkyl; $R^2$ at each occurrence is independently selected from alkyl, aryl, arylalkyl and a bond; and n ranges from 10 to 1,000, or from 160-250, wherein said alkyl, alkenyl, alkynyl, aryl, arylalkyl, heteroaryl, heteroarylalkyl, cycloalkyl, cycloalkylalkyl, heterocyclyl, and heterocyclylalkyl are each independently, at each occurrence, unsubstituted or substituted with one or more suitable substituents.

In certain embodiments, $R^1$ at each occurrence is independently selected from alkyl, alkenyl, aryl, and arylalkyl, wherein said alkyl, alkenyl, aryl, and arylalkyl are each independently, at each occurrence, unsubstituted or substituted with one or more suitable substituents. In certain embodiments, $R^1$ is methyl at each occurrence. In certain embodiments, $R^1$ is methyl at each occurrence and $R^2$ is a bond at each occurrence.

In certain embodiments, the polysiloxane component is a hydroxy-terminated polydimethylsiloxane having formula:

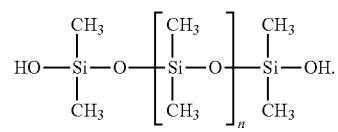

In certain embodiments, the polysiloxane component is a hydroxy-terminated polydimethylsiloxane resin having a weight average molecular weight of 1,000 g/mol to 100,000 g/mol, 3,000 g/mol to 100,000 g/mol, or 14,000 g/mol to 42,000 g/mol, and a viscosity of 70 centistoke to 100,000 centistoke or 750 centistoke to 20,000 centistoke.

The polysiloxane content of the disclosed compositions may range from 35 wt % to 65 wt %, from 40 wt % to 60 wt %, or from 45 wt % to 55 wt %, based on total weight of the composition. In certain embodiments, the polysiloxane content of the disclosed composition is about 35 wt %, about 40 wt %, about 45 wt %, about 50 wt %, about 55 wt %, about 60 wt %, or about 65 wt %, based on total weight of the composition.

The polysiloxane content of the disclosed compositions may range from 60 wt % to 100 wt %, 80 wt % to 95 wt %, or from 85 wt % to 90 wt %, based on binder solids. In certain embodiments, the polysiloxane content of the disclosed composition is about 60 wt %, about 65 wt %, about 70 wt %, about 75 wt %, about 80 wt %, about 85 wt %, about 90 wt %, about 95 wt %, or about 100 wt %, based on binder solids.

b. Ultraviolet Absorbers

The disclosed compositions include at least one ultraviolet absorber (also referred to as a UV-absorber or UVA). Suitable ultraviolet absorbers include, but are not limited to, aromatic propanedione UV absorbers (e.g., 4-t-Butyl-4'-methoxydibenzoylmethane or avobenzone, GIVSORB UV-14; and mixtures thereof); benzimidazole UV absorbers (e.g., 2-Phenyl-1H-benzimidazole-5-sulfonic acid, GIVSORB UV-16; and mixtures thereof); benzophenone UV absorbers (e.g., 2-Hydroxy-4-n-octyloxybenzophenone, UVINUL 3008; 2-Hydroxy-4-methoxybenzophenone, UVINUL 3040; 2-Hydroxy-4-methoxy-5-sulfobenzophenone or Sulisobenzone, UVINUL MS 40; 2-(4-Benzoyl-3-hydroxyphenoxy)-2-propenoic acid ethyl ester, CYASORB UV 2098; Homopolymer of 4-(2-Acryloyloxyethoxy)-2-hydroxybenzophenone, CYASORB UV 2126; 2,2'-Dihydroxy-4-methoxybenzophenone or Dioxybenzone, CYASORB UV 24; 2-Hydroxy-4-(2-hydroxy-3-decyloxypropoxy)benzophenone and 2-Hydroxy-4-(2-hydroxy-3-octyloxypropoxy) benzophenone, MARK 1535; 2,4,4'-Trihydroxybenzophenone, MAXGARD 200; 2-Hydroxy-4-(isooctyloxy) benzophenone, MAXGARD 800; 2-Hydroxy-4-dodecyloxybenzophenone, UVINUL 410; 2,2'-Dihydroxy-4,4'-dimethoxy-5,5'-disulfobenzophenone, disodium salt, UVINUL 3048; 2,4-Dihydroxybenzophenone or 4-Benzoylresorcinol, UVINUL 400; 2,2'-Dihydroxy-4,4'-dimethoxybenzophenone, UVINUL D 49; 2,2',4,4'-Tetrahydroxybenzophenone, UVINUL D 50; 2,2'-Dihydroxy-4-(2-hydroxyethoxy)benzophenone, UVINUL X-19; 2-Hydroxy-4benzyloxybenzophenone, Seesorb 105; and mixtures thereof); benzopyranone UV absorbers (e.g., 3,3',4',5,7-pentahydroxyflavone or quercetin; and mixtures thereof); benzotriazole UV absorbers (e.g., 2-[2-hydroxy-5-(1,1,3,3-tetramethylbutyl)phenyl]benzotriazole, TINUVIN 329; 2-(2'-hydroxy-5'-(2-hydroxyethyl))benzotriazole, NORBLOC 6000; 2-(2'-hydroxy-5'-methacrylyloxyethylphenyl)-2H-benzotriazole, NORBLOC 7966; 1,1,1-tris(hydroxyphenyl)ethane benzotriazole, THPE BZT; 5-t-butyl-3-(5-chloro-2H-benzotriazol-2-yl)-4-hydroxybenzenepropanoic acid octyl ester and 3-(5-chloro-2H-benzotriazol-2-yl)-5-t-butyl-4-hydroxybenzenepropanoic acid octyl ester, TINUVIN 109; a-[3-[3-(2H-benzotriazol-2-yl)-5-t-butyl-4-hydroxyphenyl]-1-oxopropyl]-w-hydroxypoly(oxy-1,2-ethanediyl) and a-[3-[3-(2H-benzotriazol-2-yl)-5-t-butyl-4-hydroxyphenyl]-1-oxopropyl]-w-[3-[3-(2H-benzotriazol-2-yl)-5-t-butyl-4-hydroxyphenyl]-1-oxopropoxy]poly(oxy-1,2-ethanediyl), TINUVIN 1130; 2-(2-Hydroxy-3,5-di-t-butylphenyl)benzotriazole, TINUVIN 320; 2-(2-hydroxy-3-t-butyl-5-methylphenyl)-5-chloro-2H-benzotriazole, TINUVIN 326; 2-(3'-5'-di-t-butyl-2'-hydroxyphenyl)-5-chlorobenzotriazole, TINUVIN 327; 2-(2-Hydroxy-3,5-di-t-amylphenyl)benzotriazole, TINUVIN 328; 3-(2H-Benzotriazol-2-yl)-5-t-butyl-4-hydroxybenzenepropanoic acid, TINUVIN 384; 2-(2H-benzotriazol-2-yl)-4-methyl-6-dodecylphenol, TINUVIN 571; 3-(2H-benzotriazol-2-yl)-5-t-butyl-4-hydroxy-1,6-hexanediyl ester of benzenepropanoic acid and 3-(2H-benzotriazol-2-yl)-5-t-butyl-4-hydroxymethyl ester of benzenepropanoic acid, TINUVIN 840; 2-[2-hydroxy-3,5-bis-(1,1-dimethylbenzyl)phenyl]-2H-benzotriazole, TINUVIN 900; 2-(2H-benzotriazol-2-yl)-6-(1-methyl-1-phenylethyl)-4-(1,1,3,3-tetramethylbutyl)phenol, TINUVIN 928; 3-(2H-benzotriazol-2-yl)-5-t-butyl-4-hydroxybenzenepropanoic acid, C7-9 branched and linear alkyl esters, TINUVIN 99; 2-(2-hydroxy-5-methylphenyl)benzotriazole, TINUVIN P; 2-(2'-hydroxy-3'-sec-butyl-5'-t-butylphenyl)benzotriazole, TINUVIN 350; 2-(2'-hydroxy-5'-t-butylphenyl)benzotriazole, TINUVIN PS; bis[2-hydroxy-3-(2H-benzotriazol-2-yl)-5-octylphenyl]methane, TINUVIN 360; and mixtures thereof); benzoate UV absorbers (e.g., hexadecyl 3,5-di-t-butyl-4-hydroxybenzoate, CYASORB UV 2908; 3-hydroxyphenylbenzoate, SEESORB 300; ethyl-4-[[(ethylphenylamino)methylene]amino] benzoate, GIVSORB UV-1; Phenyl 2-hydroxybenzoate or phenylsalicylate, SEESORB 201; 2,4-di-t-butylphenyl-3,5-di-t-butyl-4-hydroxybenzoate, TINUVIN 120; 4-Bis(polyethoxy)amino acid polyethoxy ethyl ester, UVINUL P 25; 4-t-Butylphenyl 2-hydroxybenzoate or 4-t-butylphenylsalicylate, Seesorb 202; and mixtures thereof); benzoxazinone UV absorbers (e.g., 2,2'-(p-phenylene)di-3,1-benzoxazin-4-one, CYASORB 3638; and mixtures thereof); cinnamates or propenoate UV absorbers (e.g., dimethyl(p-methoxybenzylidene)malonate, SANDUVOR PR 25; 3-(4-methoxyphenyl)-2-propenoic acid 2-ethylhexyl ester or octyl p-methoxycinnamate, UVINUL 3039; and mixtures thereof); cyanoacrylate UV absorbers (e.g., ethyl-2-cyano-3,3-diphenylacrylate, UVINUL 3035; 2-ethylhexyl-2-cyano-3,3-diphenylacrylate, UVINUL 3039; 1,3-bis-[(2'-cyano-3,3'-diphenylacryloyl)oxy]-2,2-bis-{[(2-cyano-3,3-diphenylacryloyl)oxy]methyl}propane, UVINUL 3030; 2-Cyano-3-(2-methylindolinyl)methylacrylate, UV Absorber Bayer 340; and mixtures thereof); cycloaliphatic ketone UV absorbers (e.g., 3-(4-methylbenzylidene)-D,L-camphor, GIVSORB UV-15; and mixtures thereof); formamidine UV absorbers (e.g., Ethyl-4-[[(methylphenylamino) methylene]amino]benzoate, GIVSORB UV-2; and mixtures thereof); formanilide (including oxamide) UV absorbers (e.g., N-(2-ethoxyphenyl)-N'-(4-isododecylphenyl)oxamide, SANDUVOR 3206; N-[5-t-Butyl-2-ethoxyphenyl]-N'-(2-ethylphenyl)oxamide, TINUVIN 315; N-(2-ethoxyphenyl)-N'-(2-ethylphenyl)oxamide, TINUVIN 312; 2H-benzimidazole-2-carboxylic acid (4-ethoxyphenyl) amide, UVINUL FK 4105; and mixtures thereof); triazine UV absorbers (e.g., 2-[4,6-bis(2,4-dimethylphenyl)-1,3,5-triazin-2-yl]-5-octyloxyphenol, CYASORB UV 1164; confidential triazine derivative, TINUVIN 1545; 2-(4,6-diphenyl-1,3,5-triazin-2-yl)-5-hexyloxyphenol, TINUVIN 1577 FF; 2-[4-((2-Hydroxy-3-dodecyloxypropyl)oxy)-2-hydroxyphenyl]-4,6-bis(2,4-dimethylphenyl)-1,3,5-triazine, TINUVIN 400; 2,4,6-Trianilino-p-(carbo-2'-ethylhexyl-1'-oxy)-1,3,5-triazine, UVINUL T-150; and mixtures thereof); and salicylate UV absorbers (e.g., 3,3,5-trimethylcyclohexylsalicylate or homomentyylsalicylate, NEO HELIOPAN HMS; menthyl-o-aminobenzoate, NEO HELIOPAN MA; and mixtures thereof);

The TINUVIN compounds are commercially available from Ciba Specialty Chemicals Corporation of Tarrytown, N.Y.; UVINULS are commercially available from BASF Corporation of Charlotte, N.C.; CYASORBS are commercially available from Cytec Industries Inc. of West Paterson, N.J.; SANDUVORS are commercially available from Clariant Corporation of Charlotte, N.C.; NORBLOCS are commercially available from Janssen Pharmaceutical of Titusville, N.J.; Quercetin is commercially available from ACROS Organics of Pittsburgh, Pa.; MAXGARDS are commercially available from Garrison Industries of El Dorado, Ark.; SEESORBS are commercially available from Shipro Kasei of Osaka, Japan; MARK compounds are commercially available from Witco Chemical of Oakland, N.J.; GIVSORBS are commercially available from Givauden-Roure Corp. of Geneva, Switzerland; and NEO HELIOPANS are commercially available from Haarmann & Reimer of Teterboro, N.J.

In certain embodiments, the UV-absorber is Tinuvin® 1130, a benzotriazole based organic UV light absorber available from BASF, Florham Park, N.J.

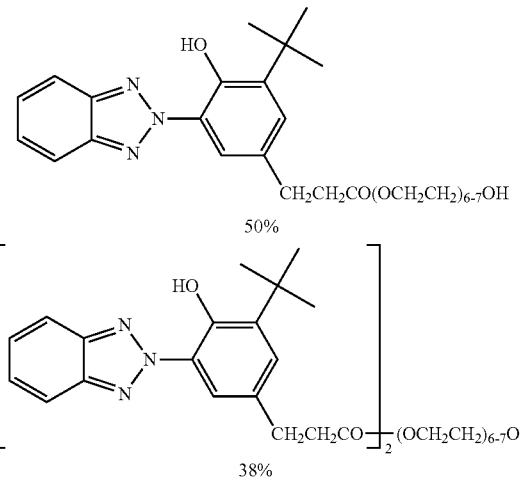

-continued

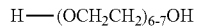

12%
Tinuvin® 1130

The UV-absorber content of the disclosed compositions may range from 0.1 wt % to 15 wt %, from 0.5 wt % to 10 wt %, from 1 wt % to 5 wt %, or from 1.5 wt % to 3 wt %, based on total weight of the composition. In certain embodiments, the UV-absorber content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or about 15 wt %, based on total weight of the composition.

The UV-absorber content of the disclosed compositions may range from 0.1 wt % to 20 wt %, from 0.1 wt % to 15 wt %, from 0.5 wt % to 10 wt %, from 1 wt % to 5 wt %, or from 1.5 wt % to 3 wt %, based on binder solids. In certain embodiments, the UV-absorber content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %, based on binder solids.

c. Pigments

The disclosed compositions can include one or more pigments (e.g., organic or inorganic pigments). Suitable pigments include, but are not limited to, zinc oxide, antimony oxide, zirconium oxide, chromium oxide, iron oxide, lead oxide, zinc sulfide, titanium dioxide (anatase, rutile, or brookite), lithopone, and carbon black. In certain embodiments, the pigment is titanium dioxide.

The pigment content of the disclosed compositions may range from 0 wt % to 15 wt %, from 1 wt % to 12 wt %, from 3 wt % to 10 wt %, from 5 wt % to 8 wt %, based on total weight of the composition. In certain embodiments, the pigment content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or about 15 wt %, based on total weight of the composition.

The pigment content of the disclosed compositions may range from 0 wt % to 30 wt %, from 0 wt % to 20 wt %, from 1 wt % to 18 wt %, from 3 wt % to 15 wt %, from 8 wt % to 12 wt %, based on binder solids. In certain embodiments, the pigment content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %, based on binder solids.

d. Fillers

The disclosed compositions can include one or more filler components. Suitable fillers include, but are not limited to, calcium carbonate, barium sulfate, iron oxide, diatomaceous earth, melamine, quartz, crystalline silica, amorphous silica, fumed silica, titanium dioxide, alumina trihydrate, zinc oxide, zirconium oxide, zirconium silicate, zinc borate, chromic oxide, crystalline silica fine powder, amorphous silica fine powder, fumed silica powder, silicone rubber powder, glass powder, silica hydrogen, silica aero gel, diatomaceous earth, calcium silicate, aluminum silicate, titanium oxide, aluminum oxide, zinc oxide, ferrite, iron oxide, carbon black, graphite, mica, clay, and bentonite.

The filler content of the disclosed compositions may range from 0 wt % to 60 wt %, from 10 wt % to 50 wt %, from 15 wt % to 45 wt %, from 15 wt % to 60 wt %, from 30 wt % to 50 wt %, from 30 wt % to 40 wt %, from 40 wt % to 60 wt %, or from 45 wt % to 55 wt %, based on total weight of the composition. In certain embodiments, the filler content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %, about 44 wt %, about 45 wt %, about 46 wt %, about 47 wt %, about 48 wt %, about 49 wt %, about 50 wt %, about 51 wt %, about 52 wt %, about 53 wt %, about 54 wt %, about 55 wt %, about 56 wt %, about 57 wt %, about 58 wt %, about 59 wt %, or about 60 wt %, based on total weight of the composition.

The filler content of the disclosed compositions may range from 0 wt % to 95 wt %, from 10 wt % to 90 wt %, from 15 wt % to 85 wt %, from 20 wt % to 80 wt %, from 50 wt % to 80 wt %, from 60 wt % to 80 wt %, or from 70 wt % to 80 wt %, based on binder solids. In certain embodiments, the filler content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %, about 44 wt %, about 45 wt %, about 46 wt %, about 47 wt %, about 48 wt %, about 49 wt %, about 50 wt %, about 51 wt %, about 52 wt %, about 53 wt %, about 54 wt %, about 55 wt %, about 56 wt %, about 57 wt %, about 58 wt %, about 59 wt %, about 60 wt %, about 61 wt %, about 62 wt %, about 63 wt %, about 64 wt %, about 65 wt %, about 66 wt %, about 67 wt %, about 68 wt %, about 69 wt %, about 70 wt %, about 71 wt %, about 72 wt %, about 73 wt %, about 74 wt %, about 75 wt %, about 76 wt %, about 77 wt %, about 78 wt %, about 79 wt %, about 80 wt %, about 81 wt %, about 82 wt %, about 83 wt %, about 84 wt %, about 85 wt %, about 86 wt %, about 87 wt %, about 88 wt %, about 89 wt %, or about 90 wt %, based on binder solids.

e. Crosslinkers

The disclosed compositions can include one or more crosslinker components. Suitable crosslinkers include, but are not limited to, organosilanes containing at least 3 hydrolyzable groups in one molecule and/or its partial hydrolysate. Exemplary hydrolyzable groups in such organosilanes or its partial hydrolysate include a ketoxime group, an alkoxy group, an acetoxy group, and an isopropenoxy group. Suitable crosslinking agents include, but are not limited to, ketoxime silanes such as tetrakis(methylethylketoxime)silane, methyltris(dimethylketoxime)silane, methyltris (methylethylketoxime)silane, ethyltris(methylethylketoxime)silane, methyltris(methyl isobutyl ketoxime)silane, and vinyl tris(methylethylketoxime)silane; alkoxysilanes such as methyltrimethoxysilane, vinyltrimethoxysilane, phenyltrimethoxysilane, and vinyltriethoxy silane; acetoxysilanes such as methyltriacetoxysilane and vinyltriacetoxysilane; isopropenoxy silanes such as methyltriisopropenoxysilane, vinyltriisopropenoxysilane, and phenyltriisopropenoxysilane; and a partial hydrolysate/condensate of such silanes. In certain embodiments, the crosslinker is tris(methylethylketoxime)methylsilane (also referred to as methyltris(methylethylketoxime)silane).

The crosslinker content of the disclosed compositions may range from 0 wt % to 15 wt %, from 1 wt % to 10 wt %, or from 3 wt % to 8 wt %, based on total weight of the composition. In certain embodiments, the crosslinker content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or about 15 wt %, based on total weight of the composition.

The crosslinker content of the disclosed compositions may range from 0 wt % to 20 wt %, from 1 wt % to 15 wt %, or from 5 wt % to 12 wt %, based on binder solids. In certain embodiments, the crosslinker content of the disclosed compositions is about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %, based on binder solids.

f. Adhesion Promoters

The disclosed compositions can include one or more adhesion promoters, also referred to as silane coupling agents. Suitable adhesion promoters include those having an alkoxysilyl, a ketoximesilyl, or an alkenoxysilyl group as the hydrolyzable group, and exemplary such compositions include vinyltris(2-methoxyethoxy)silane, 3-methacryloxypropyltrimethoxysilane, 2-(3,4-epoxycyclohexyl)ethyl trimethoxysilane, 3-glycidoxypropyltrimethoxysilane, 3-glycidoxypropylmethyldiethoxysilane, N-(2-aminoethyl) 3-aminopropyltrimethoxysilane, 3-aminopropyltriethoxysilane, 3-(N-aminomethylbenzylamino)propyltrimethoxysilane, 3-mercaptopropyltrimethoxysilane, 3-aminopropyltris (methylethylketoxime)silane, 3-glycidoxy propyltriisopropenoxysilane, and 3-glycidoxypropylmethyldiisopropenoxysilane. In certain embodiments, the adhesion promoter is 3-aminopropyltriethoxysilane.

The adhesion promoter content of the disclosed compositions may range from 0 wt % to 5 wt %, from 0.5 wt % to 3 wt %, based on total weight of the composition. In certain embodiments, the adhesion promoter content of the disclosed compositions is about 0.5 wt %, about 1.0 wt %, about 1.5 wt %, about 2.0 wt %, about 2.5 wt %, or about 3.0 wt %, based on total weight of the composition.

The adhesion promoter content of the disclosed compositions may range from 0 wt % to 5 wt %, from 0.5 wt % to 3 wt %, based on binder solids. In certain embodiments, the adhesion promoter content of the disclosed compositions is about 0.5 wt %, about 1.0 wt %, about 1.5 wt %, about 2.0 wt %, about 2.5 wt %, about 3.0 wt %, about 3.5 wt %, about 4.0 wt %, about 4.5 wt %, or about 5.0 wt %, based on binder solids.

g. Catalysts

The disclosed compositions can include one or more catalysts. Suitable catalysts include, but are not limited to, organo tin catalysts such as dibutyltin diacetate, stannous octoate, dibutyltin dioctoate, dibutyltin dilaurate, dibutyltin dimethoxide, dibutyltin bis(acetylacetonate), dibutyltin bis(benzylmalate), dimethyltin dimethoxide, dimethyltin diacetate, dioctyltin dioctate, dioctyltin dilaurate, tin dioctate, and tin laulate; and organotitanium catalysts such as tetraisopropyl titanate, tetra-n-butyl titanate, tetra-tertiary butyl titanate, tetra-n-propyl titanate, tetra-2-ethylhexyl titanate, diisopropyl di-tertiary butyl titanate, dimethoxy titanium bisacetylacetonate, diisopropoxy titanium bisethyl acetoacetate, di-tertiary butoxy titanium bisethyl acetoacetate, and di-tertiary butoxy titanium bismethyl acetoacetate.

The catalyst content of the disclosed compositions may range from 0 wt % to 3 wt %, based on total weight of the composition. In certain embodiments, the catalyst content of the disclosed compositions is 1 wt % or less, 0.5 wt % or less, 0.1 wt % or less, 0.05 wt % or less, about 1 wt %, about 0.5 wt %, about 0.1 wt %, or about 0.05 wt %, based on total weight of the composition.

The catalyst content of the disclosed compositions may range from 0 wt % to 3 wt %, based on binder solids. In certain embodiments, the catalyst content of the disclosed compositions is 1 wt % or less, 0.5 wt % or less, 0.1 wt % or less, 0.05 wt % or less, about 1 wt %, about 0.5 wt %, about 0.1 wt %, or about 0.05 wt %, based on binder solids.

h. Solvents

The disclosed compositions can include one or more solvents. Suitable solvents include, but are not limited to, mineral spirits, toluene, hexane, xylene, or combinations thereof. In certain embodiments, the compositions are solvent-free.

The solvent content of the disclosed compositions may range from 0 wt % to 50 wt %, or from 0 wt % to 20 wt %, based on total weight of the composition. In certain embodiments, the solvent content of the disclosed compositions is 0 wt %, about 5 wt %, about 10 wt %, about 15 wt %, about 20 wt %, about 25 wt %, about 30 wt %, about 35 wt %, about 40 wt %, about 45 wt %, or about 50 wt %, based on total weight of the composition.

i. Additives

The disclosed compositions can include one or more additives. Exemplary additives include, but are not limited to, reinforcing fibers, wetting agents, dispersants, thickeners (rheology modifiers), plasticizers, catalysts, driers, biocides, photoinitiators, processing aids, antioxidants, ageing inhibitors, buffers, and antimicrobials.

The additive content of the disclosed compositions may range from 0 wt % to 60 wt %, based on total weight of the composition. The additive content of the disclosed compositions may range from 0 wt % to 80 wt %, based on binder solids.

3. PROPERTIES OF THE COMPOSITIONS

The disclosed compositions can have a combination of desired properties. The compositions can have improved functional properties (e.g., dirt pick-up resistance, cleanability, color performance, reflective properties, mechanical properties) or aesthetic properties, or any combination thereof.

a. Tensile Strength

The disclosed compositions may have a tensile strength of 100 psi to 2,000 psi, 100 psi to 400 psi, or 200 psi to 400 psi, as measured according to ASTM D412. The disclosed compositions may have a tensile strength of about 100 psi, about 150 psi, about 200 psi, about 250 psi, about 300 psi, about 350 psi, about 400 psi, about 450 psi, or about 500 psi, as measured according to ASTM D412.

b. Elongation at Break

The disclosed compositions may have an elongation at break of 50% to 400% or 50% to 200%, as measured according to ASTM D412. The disclosed compositions may have an elongation at break of 50% or greater, 100% or greater, 150% or greater, 200% or greater, 250% or greater, 300% or greater, 350% or greater, or 400% or greater, as measured according to ASTM D412.

c. Reflectivity

Reflectivity can be measured using a StellarNet Miniature Spectrometer, for example.

The disclosed compositions may have a reflectivity of 13% or greater, 14% or greater, 15% or greater, 16% or greater, 17% or greater, 18% or greater, 19% or greater, 20% or greater, 21% or greater, 22% or greater, 23% or greater, 24% or greater, 25% or greater, 26% or greater, 27% or greater, or 28% or greater, wherein the reflectivity is measured after 3 months of exterior exposure or greater, 4 months of exterior exposure or greater, 5 months of exterior exposure or greater, 6 months of exterior exposure or greater, 7 months of exterior exposure or greater, 8 months of exterior exposure or greater, 9 months of exterior exposure or greater, 10 months of exterior exposure or greater, 11 months of exterior exposure or greater, 12 months of exterior exposure or greater, 1.5 years of exterior exposure or greater, 2 years of exterior exposure or greater, 2.5 years of exterior exposure or greater, or 3 years of exterior exposure or greater, wherein the reflectivity is measured at 380 nanometers.

The disclosed compositions may have a reflectivity of 75% or greater, 76% or greater, 77% or greater, 78% or greater, 79% or greater, 80% or greater, 81% or greater, 82% or greater, 83% or greater, 84% or greater, 85% or greater, 86% or greater, 87% or greater, 88% or greater, 89% or greater, or 90% or greater, wherein the reflectivity is measured after 3 months of exterior exposure or greater, 4 months of exterior exposure or greater, 5 months of exterior exposure or greater, 6 months of exterior exposure or greater, 7 months of exterior exposure or greater, 8 months of exterior exposure or greater, 9 months of exterior exposure or greater, 10 months of exterior exposure or greater, 11 months of exterior exposure or greater, 12 months of exterior exposure or greater, 1.5 years of exterior exposure or greater, 2 years of exterior exposure or greater, 2.5 years of exterior exposure or greater, or 3 years of exterior exposure or greater, wherein the reflectivity is measured at 500 nanometers.

The disclosed compositions may have a reflectivity of 80% or greater, 81% or greater, 82% or greater, 83% or greater, 84% or greater, 85% or greater, 86% or greater, 87% or greater, 88% or greater, 89% or greater, 90% or greater, 91% or greater, 92% or greater, 93% or greater, 94% or greater, or 95% or greater, wherein the reflectivity is measured after 3 months of exterior exposure or greater, 4 months of exterior exposure or greater, 5 months of exterior exposure or greater, 6 months of exterior exposure or greater, 7 months of exterior exposure or greater, 8 months of exterior exposure or greater, 9 months of exterior exposure or greater, 10 months of exterior exposure or greater, 11 months of exterior exposure or greater, 12 months of exterior exposure or greater, 1.5 years of exterior exposure or greater, 2 years of exterior exposure or greater, 2.5 years of exterior exposure or greater, or 3 years of exterior exposure or greater, wherein the reflectivity is measured at 650 nanometers.

d. Delta L and Delta E

Appearance measurements can be taken before and after a test period (i.e., exposure period) of a coated panel, whether a control or experimental coated panel, with the difference between these before and after measurements calculated to determine changes as a result of the soiling test employed. The measurements may be performed on an exposed panel after the test period relative to an unexposed part of the panel or an unexposed control panel. Colorimetric techniques can be employed to demonstrate the advantageous dirt pick-up resistance or cleanability of the disclosed compositions. Colorimeter measurements can be performed using a X-Rite SP64 Spherical Spectrophotometer, for example. The measurements can be performed on cleaned or uncleaned panels. Panels can be cleaned by, for example, applying a standard detergent solution (e.g., a trisodium phosphate solution), allowing the solution to stand for 5 minutes, and then rinsing with a power washer. In this case, coated panels were simply treated with detergent solution and wiped clean with cold water and a cloth towel. Cleaning the panels prior to measuring delta E reduces variability of results and provides for a more accurate measurement of formulation performance.

The disclosed compositions may have a delta L of −30 to 0, −20 to 0, −10 to 0, −5 to 0, −4 to 0, −3 to 0, −2 to 0, −1.5 to 0, or −1 to 0, measured on cleaned panels after a test period of 6 months or greater, 12 months or greater, 18 months or greater, 19 months or greater, 24 months or greater, 30 months or greater, 36 months or greater, 4 years or greater, or 5 years or greater.

The disclosed compositions may have a delta E of 15 or less, 10 or less, 5 or less, 4.5 or less, 4.0 or less, 3.5 or less, 3.0 or less, 2.5 or less, 2.0 or less, 1.5 or less, 1.0 or less, 0.9 or less, or 0.8 or less, measured on cleaned panels after a test period of 6 months or greater, 12 months or greater, 18 months or greater, 19 months or greater, 24 months or greater, 30 months or greater, 36 months or greater, 4 years or greater, or 5 years or greater. In certain embodiments, the disclosed compounds may have a delta E of about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 4.0, about 4.5, or about 5.0, measured on cleaned panels after a test period of 6 months or greater, 12 months or greater, 18 months or greater, 19 months or greater, 24 months or greater, 30 months or greater, 36 months or greater, 4 years or greater, or 5 years or greater.

4. METHODS OF USE

The disclosed compositions can be applied to any selected surface or substrate. For example, the disclosed compositions can be applied to an organic, inorganic, or composite substrate, such as synthetic and natural polymers, wood, metals, glass, mineral substrates such as concrete, plaster, bricks, stones, and ceramics. The compositions can be applied to a wide variety of weathered and unweathered roofing substrates, such as, for example, asphaltic coatings, roofing felts, synthetic polymer membranes, foamed polyurethane (e.g., spray polyurethane foam), metals (e.g., aluminum), modified bitumen membranes; or to previously painted, primed, undercoated, worn, or weathered substrates, such as metal roofs weathered thermoplastic polyolefin, weathered poly(vinyl chloride), weathered silicone rubber, and weathered ethylene propylene diene monomer rubber.

The disclosed compositions can be applied by brushing, spraying, squeegee, pouring, draw down, spin coating, dipping, applying with a roller or curtain coater, the like, and any combination thereof. The compositions can be adjusted to the consistency suitable for use by heating, particularly for spray applications, or by inclusion of one or more solvents.

The thicknesses of coatings of the disclosed compositions will depend upon the specific requirements of the application and the desired level of protection. In certain embodiments, a coating can have an average thickness of 250 to 1500 microns, 200 to 1000 microns, 200 to 750 microns, or 300 to 600 microns. In certain embodiments, a coating can have an average thickness of about 200 microns, about 250 microns, about 300 microns, about 350 microns, about 400 microns, about 450 microns, about 500 microns, about 550 microns, about 600 microns, about 650 microns, about 700 microns, about 750 microns, about 800 microns, about 850 microns, about 900 microns, about 950 microns, or about 1000 microns or greater.

The compositions can be dried at ambient temperature and humidity or at elevated temperature and ambient humidity. In certain embodiments, substrates can be prepared for application of the compositions by cleaning or treatment by physical abrasion, flame ionization, powerwashing with water, applying an aqueous cleaning solution, such as, for example, from 5 wt % to 10 wt % trisodium phosphate, or other cleaning agents, followed by powerwashing with water, or plasma treatment prior to coating.

5. KITS

Disclosed are kits for conveniently and effectively implementing the using the disclosed compositions. Such kits may include one or more components of the disclosed compositions together or in separate vessels, and optionally one or more of instructions, packaging, and dispensers. Kit components may be packaged for either manual or partially or wholly automated practice of the foregoing methods.

6. EXAMPLES

The foregoing may be better understood by reference to the following examples, which are presented for purposes of illustration and are not intended to limit the scope of the invention.

Example 1

Formulations

A white hydroxyl-terminated polydimethylsiloxane coating composition was modified with the addition of 3% Tinuvin 1130 UV absorber (a mixture of 50% beta-[3-(2-H-Benzotriazole-2-yl)-4-hydroxy-5tert.butylphenyl]-propionic acid-poly(ethylene glycol) 300 ester and 50% Bis{beta-[3-(2-H-Benzotriazole-2-yl)-4-hydroxy-5tert.butylphenyl]-propionic acid}-poly(ethylene glycol) 300 ester), based on binder solids. The resultant composition yielded films which are significantly more resistant to embedded dirt and grime. The cured films showed less dirt accumulation and easier cleaning with standard cleaners.

Formulation 1: Control Elastomeric Silicone Formulation

| | |
|---|---|
| OH terminated PDMS resin | 49.6 grams |
| Treated Fumed Silica | 1.0 grams |
| Titanium Oxide Pigment | 6.3 grams |
| Crystalline silica filler | 37.4 grams |
| Tris(methylethylketoxime) methyl silane | 4.6 grams |
| n-propylaminosilane | 0.9 grams |
| Organotin catalyst | 0.1 grams |

PDMS = polydimethylsiloxane

Formulation 2: Exemplary Elastomeric Silicone Formulation
(3 wt % Tinuvin 1130 Based on Binder Solids)

| | |
|---|---|
| OH terminated PDMS resin | 49.6 grams |
| Treated Fumed Silica | 1.0 grams |
| Titanium Oxide Pigment | 6.3 grams |
| Crystalline silica filler | 37.4 grams |
| Tris(methylethylketoxime) methyl silane | 4.6 grams |
| n-propylaminosilane | 0.9 grams |
| Organotin catalyst | 0.1 grams |
| Tinuvin 1130 | 1.5 grams |

Formulation 3: Exemplary Elastomeric Silicone Formulation
(13 wt % Tinuvin 1130 Based on Binder Solids)

| | |
|---|---|
| OH terminated PDMS resin | 46.5 grams |
| Treated Fumed Silica | 0.9 grams |
| Titanium Oxide Pigment | 5.9 grams |
| Crystalline silica filler | 35.1 grams |
| Tris(methylethylketoxime) methyl silane | 4.3 grams |
| n-propylaminosilane | 0.9 grams |
| Organotin catalyst | 0.1 grams |
| Tinuvin 1130 | 6.3 grams |

Example 2

Reflectivity and Color Performance after 10 Months Exterior Exposure

Formulation 2 was compared to the control Formulation 1 which did not contain the UV absorber. Films were applied to 6"×12" aluminum panels using a square frame drawdown apparatus. Once allowed to cure overnight, dry film thicknesses were measured to be between 20 and 22 dry mils (508 to 559 microns). The cured films were then placed in an outside horizontal exposure rank located in Waukesha, Wis.

After 10 months of outside exposure, the coated panels were removed from the exposure rack and tested for % reflectivity at various wavelengths of light using a StellarNet Miniature Spectrometer. Colorimetric readings were also taken using a X-Rite SP64 Spherical Spectrophotometer.

TABLE 1

% Reflectance Readings at Different Wavelengths (10 Month Outside Exposure)

| | Formulation 1 (control formula) | Formulation 2 (exemplary formula) |
|---|---|---|
| 380 nm | 12% | 16% |
| 500 nm | 75% | 84% |
| 650 nm | 80% | 92% |

*Both coatings exhibited similar % reflectance readings before exposure

As can be seen in Table 1, Formulation 2 exhibited a greater reflectance in the three wavelengths measured. These wavelengths represent near-UV and visible wavelengths of light. The numbers correspond with the greater perceived whiteness of the Formulation 2 versus Formulation 1.

TABLE 2

Colorimetric Comparison (10 Months Outside Exposure versus Unexposed Control)

|  | Formulation 1 | Formulation 2 |
|---|---|---|
| Delta a | 0.57 | 0.15 |
| Delta b | 2.57 | 1.33 |
| Delta L | −5.87 | −1.32 |
| Delta E | 6.38 | 1.88 |

Delta a indicates a shift in color on the red/green side (+ = more red, − = more green);
Delta b indicates a shift in color on the yellow/blue side (+ = more yellow, − = more blue);
Delta L indicates a shift in lightness/darkness (+ = lighter, − = darker); and
Delta E is an absolute value on color difference perception (larger number = greater perceived overall color difference).

Table 2 indicates that Formulation 2 shows less of an increase in yellowness, less darkening, and less overall color change after 10 months of outdoor exposure versus control Formulation 1 after 10 months of outdoor exposure. This result was unexpected.

TABLE 3

Colorimetric Comparison (19 Months Outside Exposure versus Standard Control)

|  | Formulation 1 | Formulation 2 |
|---|---|---|
| Delta a | 0.58 | 0.11 |
| Delta b | 2.78 | 1.09 |
| Delta L | −6.52 | −0.89 |
| Delta E | 4.25 | 1.42 |

Table 3 indicates that Formulation 2 again shows less of an increase in yellowness, less darkening, and less overall color change after 19 months of outdoor exposure versus Formulation 1 after 19 months of outdoor exposure. Each of the exposed formulations were evaluated against unexposed Formulation 1 as the standard control. While the use of a UV absorber may reduce color differences, the color differences shown in this example are not primarily due to yellowing of the film, but rather dirt pick-up. The dirt pick-up is noted by the dark blotchy appearance of Formulation 1 (e.g., see FIG. 1 and FIG. 2). A higher degree of yellowing of Formulation 1 does occur versus Formulation 2, however darkening of the coating is the main factor for overall color difference perception.

Example 3

Mechanism Analysis

Figure 2:
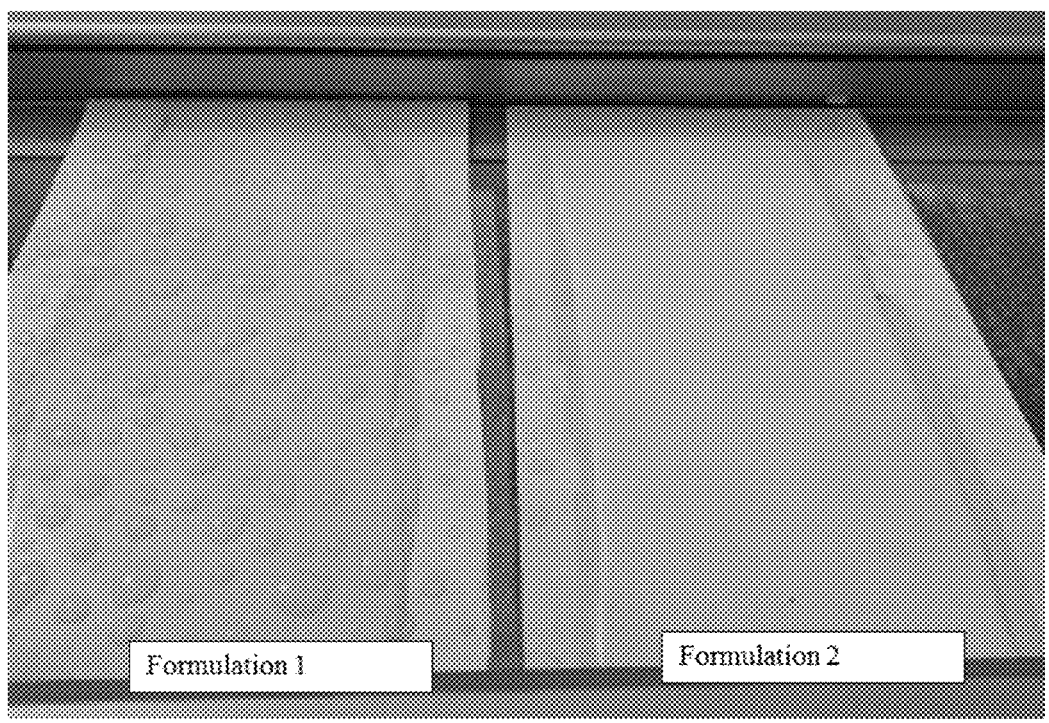
FIG. 2 depicts films of control (Formulation 1) and exemplary (Formulation 2) formulations on aluminum after three months of exterior exposure and subsequent to precipitation.

After approximately three months of exterior exposure, the UV-absorber modified coating shows a greater tendency to sheet water off the surface of the coating. Sheeting action is normally associated with increased surface energy of the substrate. This allows water to more easily wet the substrate. A thin layer of water along the surface of the coating will dry more quickly than water that has beaded on the surface of the coating. As seen in FIG. 1, Formulation 1 shows the outline of water marks. The watermarks are considerably more muted for Formulation 2. FIG. 2 shows the effect of a rain storm several hours after the storm has ended.

The control formulation (Formulation 1) exhibits a darker appearance, indicative of dirt pick-up. It retained the water beading effect seen when the coating was first applied. Formulation 2 initially showed the same degree of beading when first exposed, but subsequently showed little or no beading effect. In FIG. 2, the water is dried from the surface of the coating, while still beading on the release paper immediate adjacent to the coating. If water dries from the surface more quickly, it reduces the time in which water can attract airborne dirt. The sheeting effect also helps to remove water from the surface of the coating.

Figure 3:
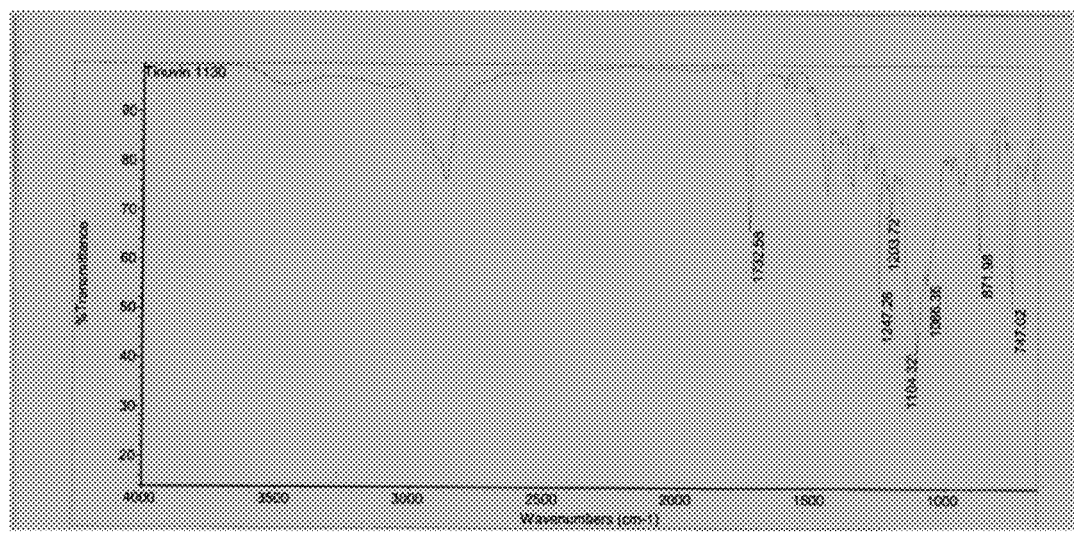
FIG. 3 depicts an FTIR of the UV-absorber Tinuvin 1130.
Figure 4:
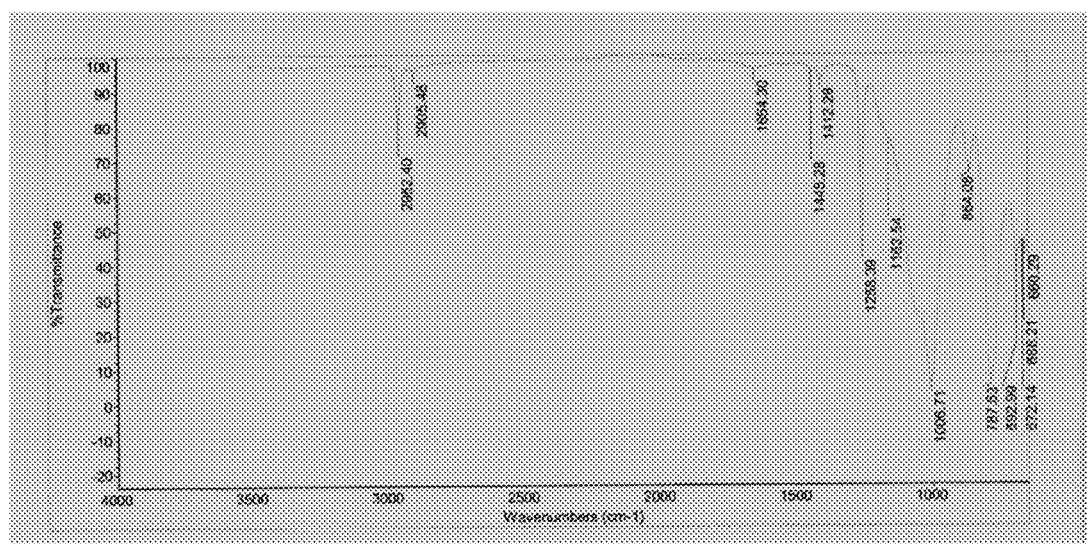
FIG. 4 depicts an FTIR of a control formulation film (no UV-absorber) with one year of outdoor exposure.
Figure 5:
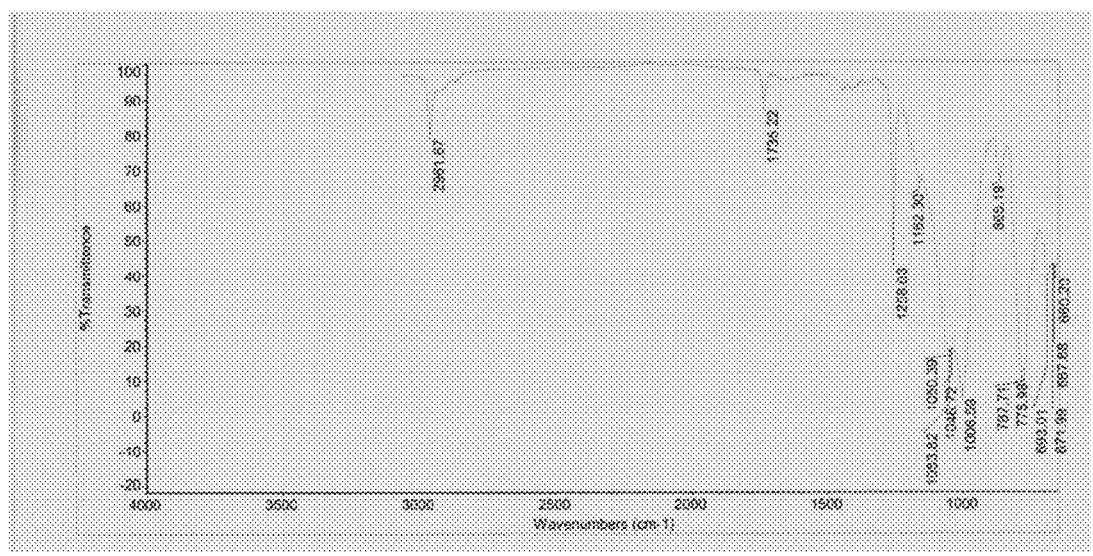
FIG. 5 depicts an FTIR of an exemplary formulation film (includes 3% Tinuvin 1130) with one year of outdoor exposure.

An analysis was conducted to determine if the surface chemistry of the UVA-modified silicone differed from the control silicone. FIG. 3 shows an FTIR reading of the UV-absorber Tinuvin 1130. FIG. 4 shows an FTIR for a film of Formulation 1 with 1 year of outdoor exposure; FIG. 5 shows an FTIR of Formulation 2 also with 1 year of outdoor exposure. One distinct difference between Formulation 1 and Formulation 2 is the peak in the 1730's wavenumber region. This peak matches a fairly strong peak seen with the Tinuvin FTIR scan.

Figure 6:
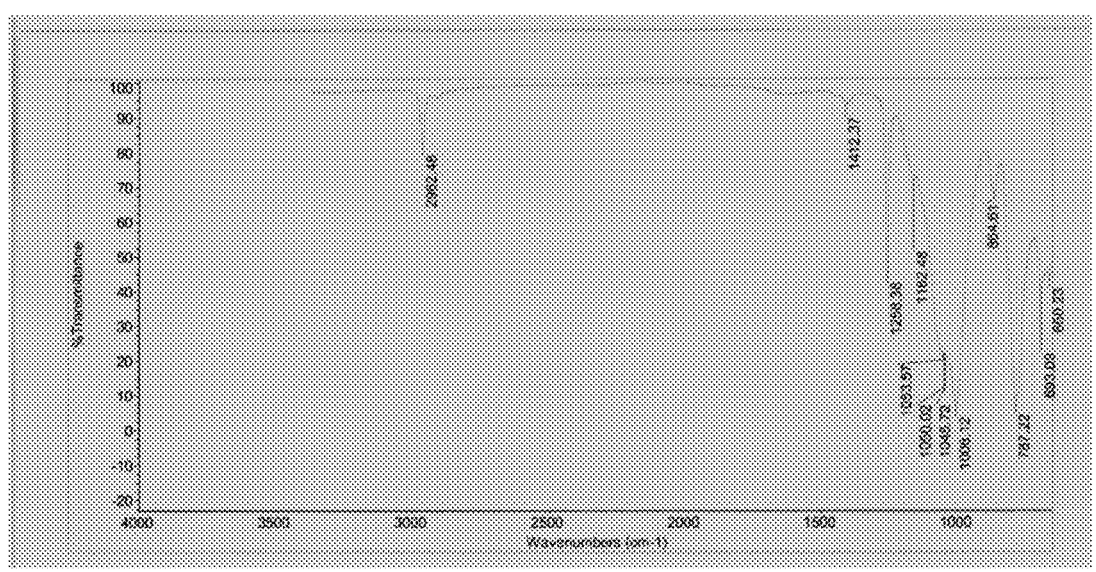
FIG. 6 depicts an FTIR of a control formulation film (no UV-absorber) with three months of outdoor exposure.
Figure 7:
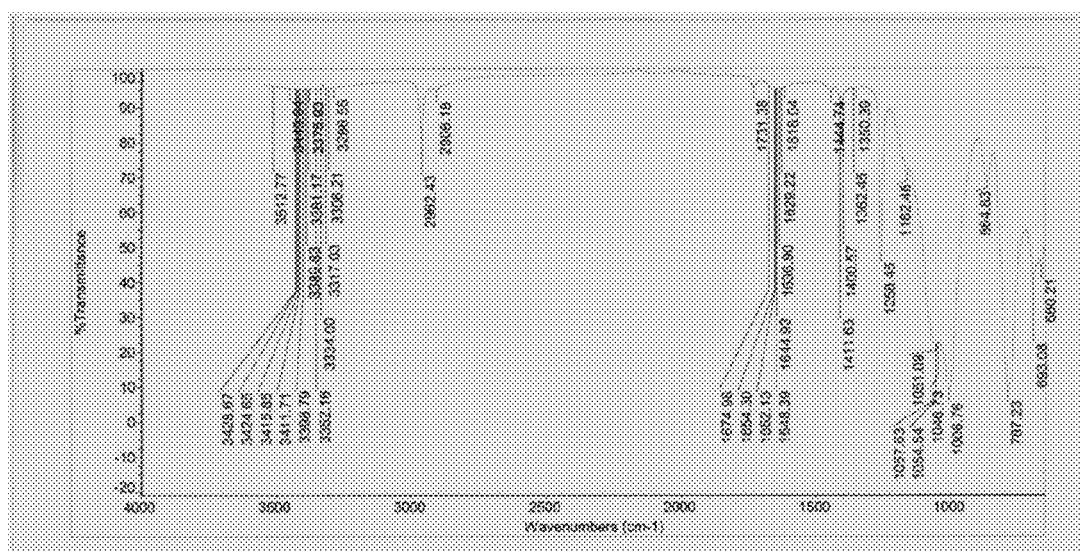
FIG. 7 depicts an FTIR of an exemplary formulation film (includes 3% Tinuvin 1130) with three months of outdoor exposure.

To ensure that this peak existence is not an anomaly, a set of newer films were analyzed with the FTIR. For these films, only 3 months of outdoor exposure was done before the films were analyzed. Again, a peak in the 1730's wavenumber region exists in Formulation 2 (FIG. 7) which does not exist in Formulation 1 (FIG. 6).

Figure 8:
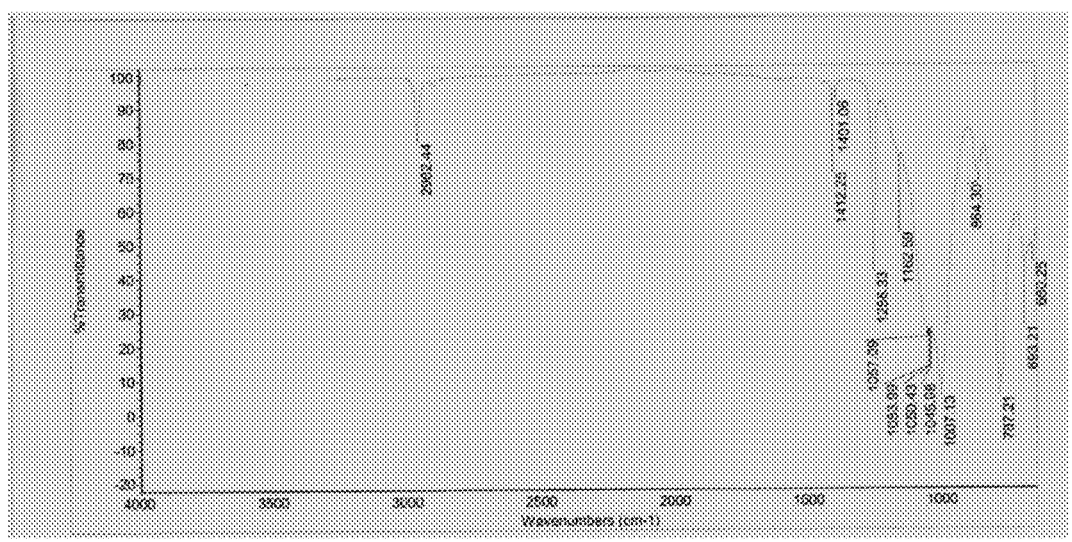
FIG. 8 depicts an FTIR of the unexposed backside of a control formulation film (no UV-absorber) with three months of outdoor exposure.
Figure 9:
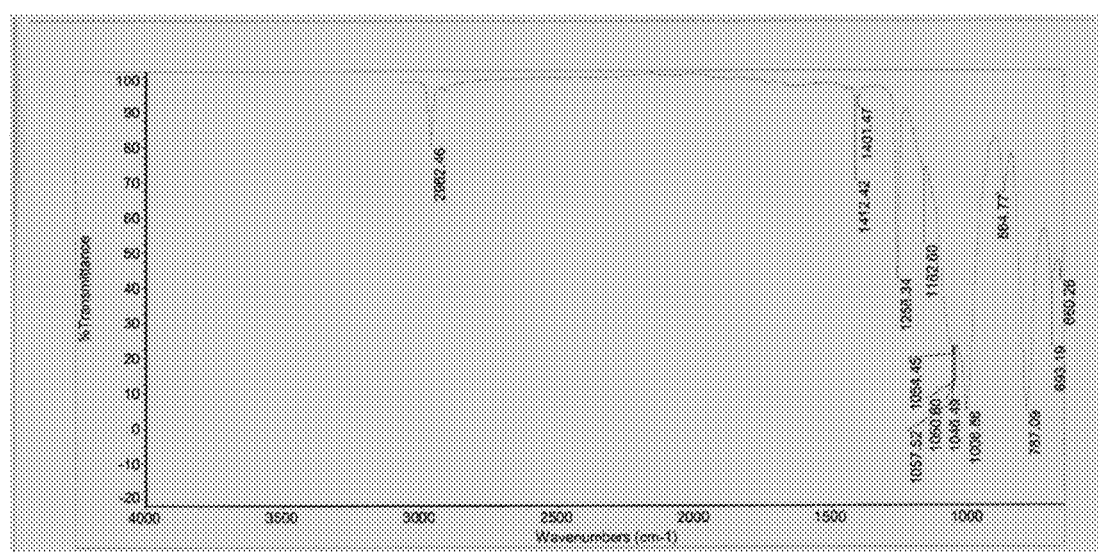
FIG. 9 depicts an FTIR of the unexposed backside of an exemplary formulation film (includes 3% Tinuvin 1130) with three months of outdoor exposure.

An analysis using FTIR was done on the backside of the films, (the films were applied to release paper for easy removal of the cured films). Both Formulation 1 (FIG. 8) and Formulation 2 (FIG. 9) were analyzed. In this case, the characteristic peak in the 1730's wavenumber region is not apparent for either film. This suggests that a migratory mechanism or a sunlight reaction between the silicone and Tinuvin 1130 is occurring. For both mechanisms, surface activity is necessary.

Figure 10:
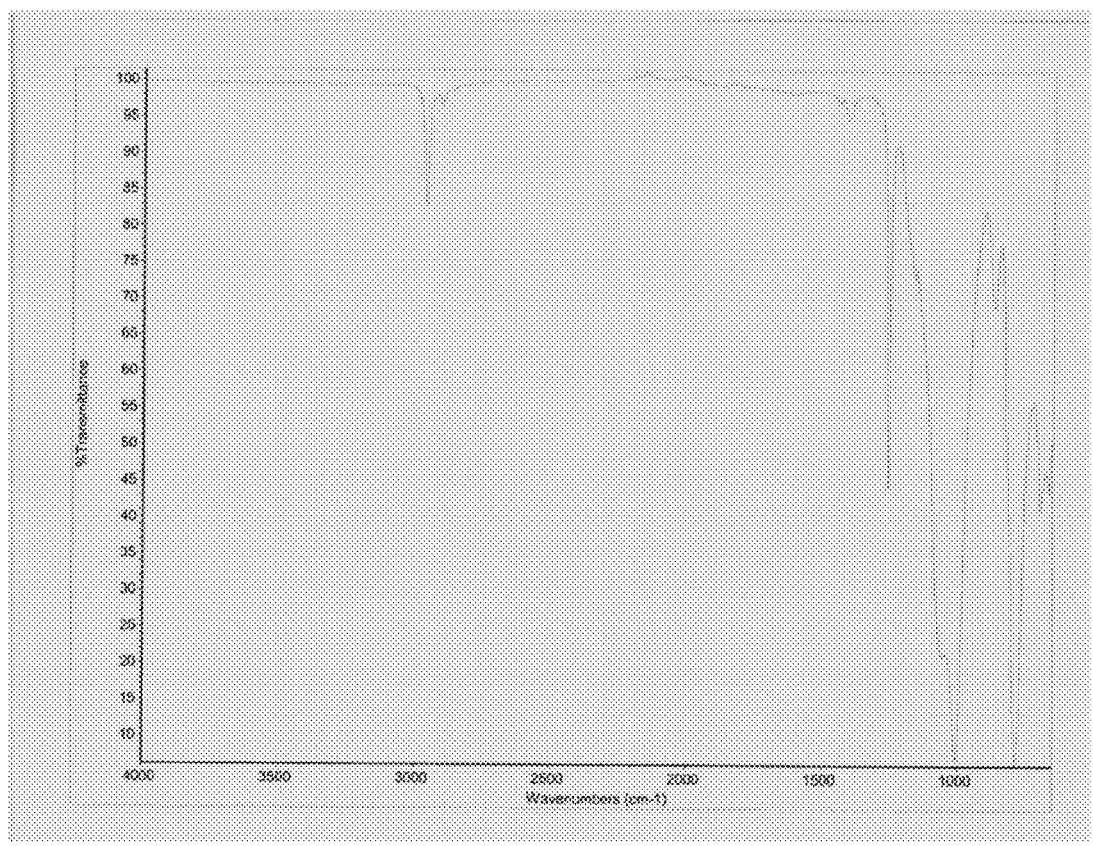
FIG. 10 depicts an FTIR of the topside of an exemplary formulation film (includes 3% Tinuvin 1130) with one day of curing and with no outdoor exposure.
Figure 11:
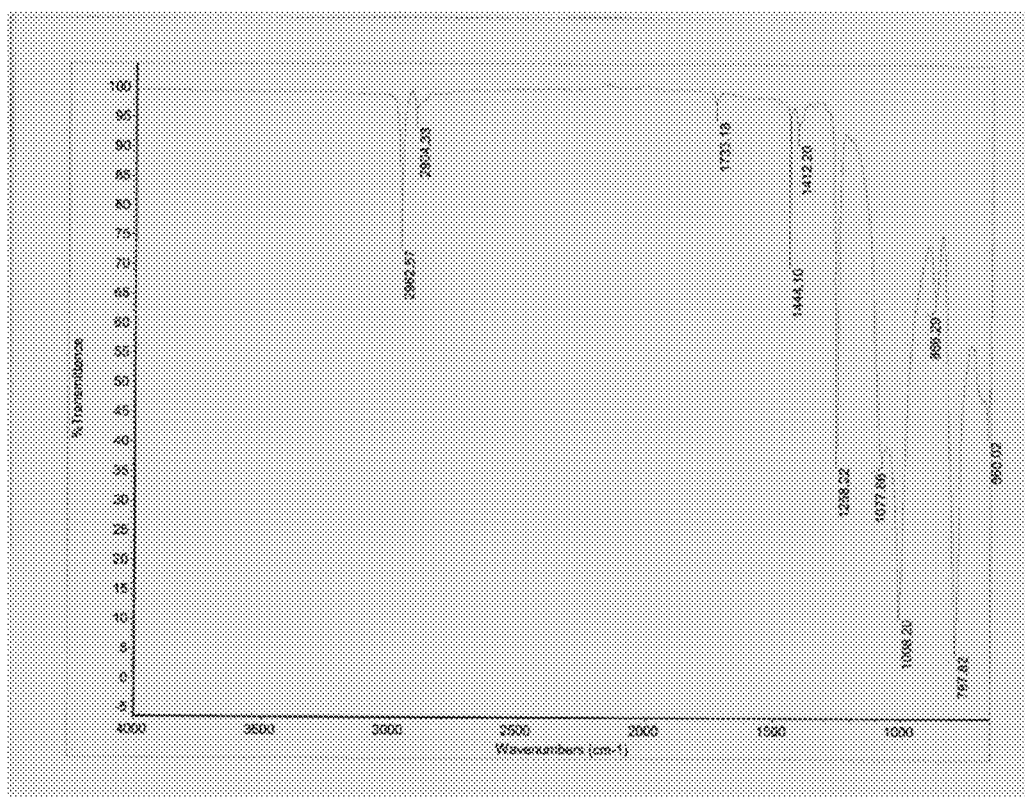
FIG. 11 depicts an FTIR of the topside of an exemplary formulation film (includes 13% Tinuvin 1130) with one day of curing and with no outdoor exposure.

To determine if the characteristic peak in the 1730's wavenumber is detectable at the surface with no migratory time or no outdoor exposure, Formulation 2 was drawn down and allowed to cure for 1 day, without any outdoor exposure (FIG. 10). There is no evidence of a peak in the 1730's wavenumber range in FIG. 10. Formulation 3 was formulated with a much higher dose of Tinuvin 1130 to a level of 13% UVA based on binder solids. A FTIR conducted on this film after curing for 24 hours without outdoor exposure, shown in FIG. 11, demonstrates that the characteristic peak in the 1730's wavenumber region is beginning to develop.

At three 3% Tinuvin 1130 (Formulation 2), the concentration of the UVA at the surface of the cured film is too low to detect with FTIR. Much higher levels of added Tinuvin 1130 show the development of the peak in the 1730's wavenumber. However, with outdoor exposure in as little as 3 months, the characteristic peak become evident on the exposed side of the UVA modified coating. The backside (the unexposed side) does not show this peak.

7. EXEMPLARY EMBODIMENTS

For reasons of completeness, various aspects of the disclosure are set out in the following numbered clauses:

Clause 1. A composition comprising a polysiloxane; an ultraviolet absorber; a pigment; a filler; a crosslinker; an adhesion promoter; a catalyst; and optionally one or more additives and optionally one or more solvents.

Clause 2. The composition of clause 1, comprising 2 wt % to 15 wt %, 3 wt % to 13 wt %, 2 wt % to 4 wt %, or 12 wt % to 14 wt % of the ultraviolet absorber, based on the polysiloxane content.

Clause 3. The composition of clause 1 or clause 2, comprising 5 wt % to 20 wt %, 8 wt % to 17 wt %, or 10 wt % to 15 wt % of the pigment, based on polysiloxane content.

Clause 4. The composition of any one of clauses 1-3, comprising 60 wt % to 90 wt %, 65 wt % to 85 wt %, or 70 wt % to 80 wt % of the filler, based on polysiloxane content.

Clause 5. The composition of any one of clauses 1-4, comprising 3 wt % to 15 wt %, 5 wt % to 13 wt %, or 8 wt % to 10 wt % of the crosslinker, based on polysiloxane content.

Clause 6. The composition of any one of clauses 1-5, comprising 0.5 wt % to 4 wt %, 1 wt % to 3.5 wt %, 1.5 wt % to 3 wt %, or 2 wt % to 2.5 wt %, of the adhesion promoter, based on polysiloxane content.

Clause 7. The composition of any one of clauses 1-6, comprising 0.05 wt % to 0.35 wt %, 0.1 wt % to 0.3 wt %, or 0.15 wt % to 0.25 wt % of catalyst, based on polysiloxane content.

Clause 8. The composition of clause 1, comprising 35 wt % to 60 wt % polysiloxane; 0.1 wt % to 15 wt % ultraviolet absorber; 1 wt % to 12 wt % pigment; 10 wt % to 60 wt % filler; 1 wt % to 10 wt % crosslinker; 0.5 wt % to 3 wt % adhesion promoter; 1 wt % or less catalyst; 0 wt % to 50 wt % additives; and 0 wt % to 50 wt % solvents; based on total weight of composition.

Clause 9. The composition of clause 1, comprising 55 wt % to 60 wt % polysiloxane; 1 wt % to 5 wt % ultraviolet absorber; 5 wt % to 8 wt % pigment; 30 wt % to 50 wt % filler; 3 wt % to 8 wt % crosslinker; 0.5 wt % to 3 wt % adhesion promoter; 1 wt % or less catalyst; 0 wt % to 50 wt % additives; and 0 wt % to 50 wt % solvents; based on total weight of composition.

Clause 10. The composition of any one of clauses 1-9, wherein the polysiloxane has formula:

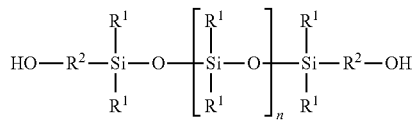

wherein R$^1$ at each occurrence is independently selected from alkyl, alkenyl, alkynyl, aryl, arylalkyl, heteroaryl, heteroarylalkyl, cycloalkyl, cycloalkylalkyl, heterocyclyl, and heterocyclylalkyl; R$^2$ at each occurrence is independently selected from alkyl, aryl, arylalkyl and a bond; and n ranges from 10 to 1,000, or from 160-250; wherein said alkyl, alkenyl, alkynyl, aryl, arylalkyl, heteroaryl, heteroarylalkyl, cycloalkyl, cycloalkylalkyl, heterocyclyl, and heterocyclylalkyl are each independently, at each occurrence, unsubstituted or substituted with one or more suitable substituents.

Clause 11. The composition of any one of clauses 1-10, wherein the polysiloxane has formula:

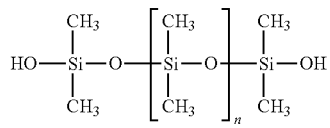

wherein n ranges from 10 to 1,000, or from 160-250.

Clause 12. The composition of any one of clauses 1-11, wherein the polysiloxane is a hydroxy-terminated polydimethylsiloxane resin having a weight average molecular weight of 1,000 g/mol to 100,000 g/mol and a viscosity of 70 centistoke to 100,000 centistoke.

Clause 13. The composition of any one of clauses 1-12, wherein the ultraviolet absorber selected from the group consisting of aromatic propanedione UV absorbers; benzimidazole UV absorbers; benzophenone UV absorbers; benzopyranone UV absorbers; benzotriazole UV absorbers; benzoate UV absorbers; benzoxazinone UV absorbers; cinnamate or propenoate UV absorbers; cyanoacrylate UV absorbers; cycloaliphatic ketone UV absorbers; formamidine UV absorbers; formanilide UV absorbers; triazine UV absorbers and salicylate UV absorbers; or any combination thereof.

Clause 14. The composition of any one of clauses 1-13, wherein the ultraviolet absorber comprises β-[3-(2-H-benzotriazole-2-yl)-4-hydroxy-5-tertbutylphenyl]-propionic acid-poly(ethylene glycol) 300-ester, bis{β-[3-(2-H-benzotriazole-2-yl)-4-hydroxy-5-tert.butylphenyl]-propionic acid}-poly(ethylene glycol) 300-ester, or a combination thereof.

Clause 15. The composition of any one of clauses 1-14, wherein the pigment is selected from the group consisting of zinc oxide, antimony oxide, zirconium oxide, chromium oxide, iron oxide, lead oxide, zinc sulfide, titanium dioxide, lithopone, and carbon black, or any combination thereof.

Clause 16. The composition of any one of clauses 1-15, wherein the pigment is titanium dioxide.

Clause 17. The composition of any one of clauses 1-16, wherein the filler is selected from the group consisting of calcium carbonate, barium sulfate, iron oxide, diatomaceous earth, melamine, quartz, crystalline silica, amorphous silica, fumed silica, titanium dioxide, alumina trihydrate, zinc oxide, zirconium oxide, zirconium silicate, zinc borate, chromic oxide, crystalline silica fine powder, amorphous silica fine powder, fumed silica powder, silicone rubber powder, glass powder, silica hydrogen, silica aero gel, diatomaceous earth, calcium silicate, aluminum silicate, titanium oxide, aluminum oxide, zinc oxide, ferrite, iron oxide, carbon black, graphite, mica, clay, and bentonite, or any combination thereof.

Clause 18. The composition of any one of clauses 1-17, wherein the filler comprises crystalline silica, treated fumed silica, or a combination thereof.

Clause 19. The composition of any one of clauses 1-18, wherein the crosslinker is selected from the group consisting of ketoxime silanes; alkoxysilanes; acetoxysilanes; isopropenoxy silanes; and a partial hydrolysate/condensate of said silanes; or any combination thereof.

Clause 20. The composition of any one of clauses 1-19, wherein the crosslinker is methyltris(methylethylketoxime)silane.

Clause 21. The composition of any one of clauses 1-20, wherein the adhesion promoter is selected from the group consisting of vinyltris(2-methoxyethoxy)silane, 3-methacryloxypropyltrimethoxysilane, 2-(3,4-epoxycyclohexyl)ethyl trimethoxysilane, 3-glycidoxypropyltrimethoxysilane, 3-glycidoxypropylmethyldiethoxysilane, N-(2-aminoethyl)3-aminopropyltrimethoxysilane, 3-aminopropyltriethoxysilane, 3-(N-aminomethylbenzylamino)propyltrimethoxysilane, 3-mercaptopropyltrimethoxysilane, 3-aminopropyltris(methylethylketoxime)silane, 3-glycidoxypropyltriisopropenoxysilane, and 3-glycidoxypropylmethyldiisopropenoxysilane, or any combination thereof.

Clause 22. The composition of any one of clauses 1-21, wherein the adhesion promoter is 3-aminopropyltriethoxysilane.

Clause 23. The composition of any one of clauses 1-22, wherein the catalyst is selected from the group consisting of dibutyltin diacetate, stannous octoate, dibutyltin dioctoate, dibutyltin dilaurate, dibutyltin dimethoxide, dibutyltin bis (acetylacetonate), dibutyltin bis(benzylmalate), dimethyltin dimethoxide, dimethyltin diacetate, dioctyltin dioctate, dioctyltin dilaurate, tin dioctate, tin laulate, tetraisopropyl titanate, tetra-n-butyl titanate, tetra-tertiary butyl titanate, tetra-n-propyl titanate, tetra-2-ethylhexyl titanate, diisopropyl di-tertiary butyl titanate, dimethoxy titanium bisacetylacetonate, diisopropoxy titanium bisethyl acetoacetate, di-tertiary butoxy titanium bisethyl acetoacetate, and di-tertiary butoxy titanium bismethyl acetoacetate, or any combination thereof.

Clause 24. The composition of any one of clauses 1-23, comprising a solvent selected from the group consisting of mineral spirits, toluene, hexane, and xylene, or any combination thereof.

Clause 25. The composition of any one of clauses 1-24, comprising one or more additives, each independently selected from the group consisting of reinforcing fibers, wetting agents, dispersants, thickeners (rheology modifiers), plasticizers, catalysts, driers, biocides, photoinitiators, processing aids, antioxidants, ageing inhibitors, buffers, and antimicrobials.

Clause 26. The composition of any one of clauses 1-25, having a polyalkylene glycol content of 0 wt % to 10 wt % or 0 wt % to 20 wt %, based on wt % of binder solids.

Clause 27. The composition of any one of clauses 1-26, having a polyethylene glycol content of 0 wt % to 10 wt % or 0 wt % to 20 wt %, based on wt % of binder solids.

Clause 28. The composition of any one of clauses 1-27, wherein at least one of the polysiloxane; the ultraviolet absorber; the pigment; the filler; the crosslinker; or the adhesion promoter includes a polyalkylene glycol tail.

Clause 29. The composition of any one of clauses 1-28, wherein at least one of the polysiloxane; the ultraviolet absorber; the pigment; the filler; the crosslinker; or the adhesion promoter includes a polyalkylene glycol tail that is a polyethylene glycol tail.

Clause 30. The composition of clause 28 or clause 29, wherein polyalkylene glycol tail has a weight average molecular weight of about 300 g/mol to about 10,000,000 g/mol.

Clause 31. The composition of clause 30, wherein polyalkylene glycol tail has a weight average molecular weight of about 300 g/mol.

Clause 32. The composition of any one of clauses 1-31, wherein the composition has a reflectivity of 13% or greater after 10 months of exposure in an exterior environment, wherein reflectivity is measured at 380 nm.

Clause 33. The composition of any one of clauses 1-32, wherein the composition has a reflectivity of 76% or greater after 10 months of exposure in an exterior environment, wherein reflectivity is measured at 500 nm.

Clause 34. The composition of any one of clauses 1-33, wherein the composition has reflectivity of 81% or greater after 10 months of exposure in an exterior environment, wherein reflectivity is measured at 650 nm.

Clause 35. The composition of any one of clauses 1-34, wherein the composition has a tensile strength of 100 psi to 2,000 psi, 100 psi to 400 psi, or 200 psi to 400 psi, as measured according to ASTM D412.

Clause 36. The composition of any one of clauses 1-35, wherein the composition has an elongation at break of 50% to 400% or 50% to 200%, as measured according to ASTM D412.

Clause 37. The composition of any one of clauses 1-36, wherein the composition has a delta L of −30 to 0, −20 to 0, −10 to 0, −5 to 0, −4 to 0, −3 to 0, −2 to 0, or −1 to 0 after 10 months of exterior exposure, measured on cleaned test panels relative to an unexposed sample of the composition.

Clause 38. The composition of any one of clauses 1-37, wherein the composition has a delta E of 15 or less, 10 or less 5 or less, 4 or less, 3 or less, 2 or less, or 1 or less after 10 months of exterior exposure, measured on cleaned test panels relative to an unexposed sample of the composition.

Clause 39. A composition, comprising: a hydroxy-terminated polydimethylsiloxane resin; 2 wt % to 15 wt % of a mixture of 50% β-[3-(2-H-benzotriazole-2-yl)-4-hydroxy-5-tertbutylphenyl]-propionic acid-poly(ethylene glycol) 300-ester and 50% bis{β-[3-(2-H-benzotriazole-2-yl)-4-hydroxy-5-tert.butylphenyl]-propionic acid}-poly(ethylene glycol) 300-ester ("TINUVIN 1130"); 11 wt % to 14 wt % titanium dioxide; 72 wt % to 78 wt % crystalline silica powder; 1 wt % to 3 wt % polydimethylsiloxane treated fumed silica; 8 wt % to 10 wt % methyltris(methylethylketoxime)silane; 1 wt % to 3 wt % (3-aminopropyl)triethoxysilane; and 0.02 wt % to 0.4 wt % tin catalyst; based on hydroxy-terminated polydimethylsiloxane resin content.

Clause 40. A method for providing a protective coating to a surface, the method comprising applying the composition according to any one of clauses 1-41 to at least a portion of the surface.

Clause 41. The method of clause 40, wherein the surface is an exterior roof of a structure.

Clause 42. The method of clause 40 or clause 41, wherein the composition is applied by brushing, spraying, squeegee, pouring, draw down, spin coating, dipping, applying with a roller or curtain coater, the like, and any combination thereof.

Clause 43. The method of any one of clauses 40-42, wherein the protective coating has an average thickness of 250 to 1500 microns.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A composition comprising
   a polysiloxane;
   an ultraviolet absorber;
   a pigment;
   a filler;
   a crosslinker;
   an adhesion promoter;
   a catalyst; and
   optionally one or more additives and optionally one or more solvents,
   wherein the polysiloxane has formula:

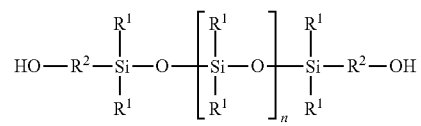

wherein
R¹ at each occurrence is independently selected from alkyl, alkenyl, alkynyl, aryl, arylalkyl, heteroaryl, heteroarylalkyl, cycloalkyl, cycloalkylalkyl, heterocyclyl, and heterocyclylalkyl;
R² at each occurrence is independently selected from alkyl, aryl, arylalkyl and a bond; and
n ranges from 10 to 1,000;
wherein said alkyl, alkenyl, alkynyl, aryl, arylalkyl, heteroaryl, heteroarylalkyl, cycloalkyl, cycloalkylalkyl, heterocyclyl, and heterocyclylalkyl are each independently, at each occurrence, unsubstituted or substituted with one or more suitable substituents.

2. The composition of claim 1, comprising
35 wt % to 60 wt % polysiloxane;
0.1 wt % to 15 wt % ultraviolet absorber;
1 wt % to 12 wt % pigment;
10 wt % to 60 wt % filler;
1 wt % to 10 wt % crosslinker;
0.5 wt % to 3 wt % adhesion promoter;
1 wt % or less catalyst;
0 wt % to 50 wt % additives; and
0 wt % to 50 wt % solvents;
based on total weight of composition.

3. The composition of claim 1, wherein n ranges from 160-250.

4. The composition of claim 1, wherein the polysiloxane has a weight average molecular weight of 1,000 g/mol to 100,000 g/mol and a viscosity of 70 centistoke to 100,000 centistoke.

5. The composition of claim 1, wherein the ultraviolet absorber is selected from the group consisting of aromatic propanedione UV absorbers; benzimidazole UV absorbers; benzophenone UV absorbers; benzopyranone UV absorbers; benzotriazole UV absorbers; benzoate UV absorbers; benzoxazinone UV absorbers; cinnamate or propenoate UV absorbers; cyanoacrylate UV absorbers; cycloaliphatic ketone UV absorbers; formamidine UV absorbers; formanilide UV absorbers; triazine UV absorbers and salicylate UV absorbers; or any combination thereof.

6. The composition of claim 1, wherein the ultraviolet absorber comprises β-[3-(2-H-benzotriazole-2-yl)-4-hydroxy-5-tertbutylphenyl]-propionic acid-poly(ethylene glycol) 300-ester, bis{β-[3-(2-H-benzotriazole-2-yl)-4-hydroxy-5-tert.butylphenyl]-propionic acid}-poly(ethylene glycol) 300-ester, or a combination thereof.

7. The composition of claim 1, wherein the pigment is selected from the group consisting of zinc oxide, antimony oxide, zirconium oxide, chromium oxide, iron oxide, lead oxide, zinc sulfide, titanium dioxide, lithopone, and carbon black, or any combination thereof.

8. The composition of claim 1, wherein the filler is selected from the group consisting of calcium carbonate, barium sulfate, iron oxide, diatomaceous earth, melamine, quartz, crystalline silica, amorphous silica, fumed silica, titanium dioxide, alumina trihydrate, zinc oxide, zirconium oxide, zirconium silicate, zinc borate, chromic oxide, crystalline silica fine powder, amorphous silica fine powder, fumed silica powder, silicone rubber powder, glass powder, silica hydrogen, silica aero gel, calcium silicate, aluminum silicate, aluminum oxide, ferrite, carbon black, graphite, mica, clay, and bentonite, or any combination thereof.

9. The composition of claim 1, wherein the crosslinker is selected from the group consisting of ketoxime silanes; alkoxysilanes; acetoxysilanes; isopropenoxy silanes; and a partial hydrolysate/condensate of said silanes; or any combination thereof.

10. The composition of claim 1, wherein the adhesion promoter is selected from the group consisting of vinyltris (2-methoxyethoxy)silane, 3-methacryloxypropyltrimethoxysilane, 2-(3,4-epoxycyclohexyl)ethyl trimethoxysilane, 3-glycidoxypropyltrimethoxysilane, 3-glycidoxypropylmethyldiethoxysilane, N-(2-aminoethyl)3-aminopropyltrimethoxysilane, 3-aminopropyltriethoxysilane, 3-(N-aminomethylbenzylamino)propyltrimethoxysilane, 3-mercaptopropyltrimethoxysilane, 3-aminopropyltris (methylethylketoxime)silane, 3-glycidoxy propyltriisopropenoxysilane, and 3-glycidoxypropylmethyldiisopropenoxysilane, or any combination thereof.

11. The composition of claim 1, wherein the catalyst is selected from the group consisting of dibutyltin diacetate, stannous octoate, dibutyltin dioctoate, dibutyltin dilaurate, dibutyltin dimethoxide, dibutyltin bis(acetylacetonate), dibutyltin bis(benzylmalate), dimethyltin dimethoxide, dimethyltin diacetate, dioctyltin dioctate, dioctyltin dilaurate, tin dioctate, tin laulate, tetraisopropyl titanate, tetra-n-butyl titanate, tetra-tertiary butyl titanate, tetra-n-propyl titanate, tetra-2-ethylhexyl titanate, diisopropyl di-tertiary butyl titanate, dimethoxy titanium bisacetylacetonate, diisopropoxy titanium bisethyl acetoacetate, di-tertiary butoxy titanium bisethyl acetoacetate, and di-tertiary butoxy titanium bismethyl acetoacetate, or any combination thereof.

12. The composition of claim 1, comprising a solvent selected from the group consisting of mineral spirits, toluene, hexane, and xylene, or any combination thereof.

13. The composition of claim 1, having a polyalkylene glycol content of 0 wt % to 20 wt %, based on wt % of binder solids.

14. The composition of claim 1, wherein at least one of the polysiloxane; the ultraviolet absorber; the pigment; the filler; the crosslinker; or the adhesion promoter includes a polyalkylene glycol tail.

15. The composition of claim 1, wherein the composition has a reflectivity of 13% or greater after 10 months of exposure in an exterior environment, wherein reflectivity is measured at 380 nm; wherein the composition has a reflectivity of 76% or greater after 10 months of exposure in an exterior environment, wherein reflectivity is measured at 500 nm; or wherein the composition has reflectivity of 81% or greater after 10 months of exposure in an exterior environment, wherein reflectivity is measured at 650 nm.

16. The composition of claim 1, wherein the composition has a delta L of −30 to 0 after 10 months of exterior exposure, measured on cleaned test panels relative to an unexposed sample of the composition.

17. The composition of claim 1, wherein the composition has a delta E of 15 or less after 10 months of exterior exposure, measured on cleaned test panels relative to an unexposed sample of the composition.

18. A composition, comprising:
a polydimethylsiloxane resin, wherein the polysiloxane has formula:

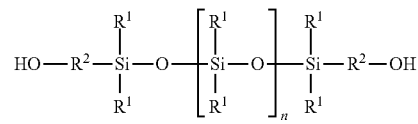

wherein
R¹ at each occurrence is independently selected from alkyl, alkenyl, alkynyl, aryl, arylalkyl, heteroaryl, heteroarylalkyl, cycloalkyl, cycloalkylalkyl, heterocyclyl, and heterocyclylalkyl;

$R^2$ at each occurrence is independently selected from alkyl, aryl, arylalkyl and a bond; and n ranges from 10 to 1,000;

wherein said alkyl, alkenyl, alkynyl, aryl, arylalkyl, heteroaryl, heteroarylalkyl, cycloalkyl, cycloalkylalkyl, heterocyclyl, and heterocyclylalkyl are each independently, at each occurrence, unsubstituted or substituted with one or more suitable substituents;

2 wt % to 15 wt % of a mixture of 50% β-[3-(2-H-benzotriazole-2-yl)-4-hydroxy-5-tertbutylphenyl]-propionic acid-poly(ethylene glycol) 300-ester and 50% bis{8-[3-(2-H-benzotriazole-2-yl)-4-hydroxy-5-tert.butylphenyl]-propionic acid}-poly(ethylene glycol) 300-ester;

11 wt % to 14 wt % titanium dioxide;

72 wt % to 78 wt % crystalline silica powder;

1 wt % to 3 wt % polydimethylsiloxane treated fumed silica;

8 wt % to 10 wt % methyltris(methylethylketoxime) silane;

1 wt % to 3 wt % (3-aminopropyl)triethoxysilane; and 0.02 wt % to 0.4 wt % tin catalyst;

based on polydimethylsiloxane resin content.

19. A method for providing a protective coating to a surface, the method comprising applying the composition according to claim 1 to at least a portion of the surface.

20. The method of claim 19, wherein the surface is an exterior roof of a structure.

* * * * *